United States Patent [19]
Suzuki et al.

[11] Patent Number: 5,579,141
[45] Date of Patent: Nov. 26, 1996

[54] LIQUID CRYSTAL DISPLAY APPARATUS HAVING REGIONS WITH DIFFERENT PRETILT ANGLES

[75] Inventors: Hisataka Suzuki, Kashihara; Mitsuaki Hirata, Tenri; Shigeaki Mizushima, Ikoma; Noriko Watanabe, Nara; Hiroko Iwagoe, Yamatokoriyama; Seiji Makino, Tenri, all of Japan

[73] Assignee: Sharp Kabushiki Kaisha, Osaka, Japan

[21] Appl. No.: 278,951

[22] Filed: Jul. 22, 1994

[30] Foreign Application Priority Data

Jul. 23, 1993 [JP] Japan .................................. 5-183091
Jul. 30, 1993 [JP] Japan .................................. 5-190499

[51] Int. Cl.$^6$ .................................................. G02F 1/1337
[52] U.S. Cl. ........................................ 359/75; 359/76
[58] Field of Search ..................................... 359/75, 76

[56] References Cited

U.S. PATENT DOCUMENTS

| | | | |
|---|---|---|---|
| 3,854,793 | 12/1974 | Kahn | 359/75 |
| 3,947,185 | 3/1976 | Maezawa | 359/82 |
| 3,967,883 | 7/1976 | Meyerhofer et al. | 359/76 |
| 4,247,174 | 1/1981 | Walter | 350/340 |
| 4,252,415 | 2/1981 | Klein et al. | 359/80 |
| 4,840,460 | 6/1989 | Bernot et al. | 350/333 |
| 4,878,742 | 11/1989 | Ohkubo et al. | 359/75 |
| 4,930,876 | 6/1990 | Suzuki et al. | 359/75 |
| 5,073,294 | 12/1991 | Shannon et al. | 359/104 |
| 5,172,255 | 12/1992 | Brosig et al. | 359/76 |
| 5,198,917 | 3/1993 | Togashi | 359/76 |
| 5,223,963 | 6/1993 | Okada et al. | 359/78 |
| 5,231,039 | 7/1993 | Sakono et al. | 437/41 |
| 5,280,375 | 1/1994 | Tsuda et al. | 359/78 |
| 5,303,076 | 4/1994 | Okada et al. | 359/78 |
| 5,309,264 | 5/1994 | Lien et al. | 359/87 |
| 5,321,537 | 6/1994 | Okada et al. | 359/76 |
| 5,398,127 | 3/1995 | Kubota et al. | 359/75 |
| 5,416,619 | 5/1995 | Koike | 359/57 |
| 5,453,862 | 9/1995 | Toko et al. | 359/76 |

FOREIGN PATENT DOCUMENTS

| | | |
|---|---|---|
| 0549283A2 | 6/1993 | European Pat. Off. . |
| 0613037A2 | 8/1994 | European Pat. Off. . |
| 56-146119 | 11/1981 | Japan . |
| 60-147722 | 8/1985 | Japan . |
| 60-211424 | 10/1985 | Japan . |

(List continued on next page.)

OTHER PUBLICATIONS

Sumiyoshi et al, "A Complementary Twisted Nematic", Functional Devices Labs, NEC Corp., pp. 35–41 (no month).
Patent Abstracts of Japan, vol. 009, No. 243 (P–392) 30 Sep. 1985 & JP–A–60095423 (Citizen Tokei KK) 28 May 1985.
Patent Abstracts of Japan, vol. 007, No. 256 (P–236) 15 Nov. 1983 & JP–A–58139124 (Tokyo Shibaura Denki KK) 18 Aug. 1983.

(List continued on next page.)

*Primary Examiner*—William L. Sikes
*Assistant Examiner*—Charles Miller
*Attorney, Agent, or Firm*—Nixon & Vanderhye P.C.

[57] ABSTRACT

The liquid crystal display apparatus of the invention includes a first substrate and a second substrate disposed so as to face each other, a liquid crystal layer sandwiched between the first substrate and the second substrate, a first alignment film formed between the liquid crystal layer and theist substrate, and a second alignment film formed between the liquid crystal layer and the second substrate. In the liquid crystal display apparatus, the liquid crystal layer includes a plurality of liquid crystal layer regions having aligning conditions which are different from each other, the plurality of liquid crystal layer regions including a first liquid crystal layer region and a second liquid crystal layer region, and wherein the orientation direction in a substrate plane of liquid crystal molecules in the vicinity of the center of the first liquid crystal layer region is different from the orientation direction in the substrate plane of liquid crystal molecules in the vicinity of the center of the second liquid crystal layer region, substantially by 90°.

40 Claims, 20 Drawing Sheets

FOREIGN PATENT DOCUMENTS

| | | |
|---|---|---|
| 60-211425 | 10/1985 | Japan . |
| 1-210932 | 8/1989 | Japan . |
| 2-12 | 1/1990 | Japan . |
| 3-230120 | 10/1991 | Japan . |
| 4-12314 | 1/1992 | Japan . |
| 5-5886 | 1/1993 | Japan . |
| 5-107544 | 4/1993 | Japan . |
| 5-173135 | 7/1993 | Japan . |
| 5-173136 | 7/1993 | Japan . |
| 5-173137 | 7/1993 | Japan . |
| 5-173138 | 7/1993 | Japan . |
| 5-188374 | 7/1993 | Japan . |
| 5-224210 | 9/1993 | Japan . |

OTHER PUBLICATIONS

Patent Abstracts of Japan, vol. 013, No. 583 (P–981) 22 Dec. 1989, & JP–a–01245223 (Nippon Telegr & Teleph Corp) 29 Sep. 1989.

IBM Technical Disclosure Bulletin, vol. 36, No. 8, Aug. 1993, New York, US, pp. 485–486, XP000390303, "Bi–Handedness Two–Domain Twist Nematic Cell for Active Matrix Display Application".

Patent Abstracts of Japan, vol. 013, No. 505 (P–959) 14 Nov. 1989 & JP–A–01 204 025 (Konica Corp) 16 Aug. 1989.

Patent Abstracts of Japan, vol. 013, No. 440 (P–940) 4 Oct. 1989 & JP–A–01 169 428 (Alps Electric Co Ltd) 4 Jul. 1989.

Patent Abstracts of Japan, vol. 013, No. 306 (P–897) 13 Jul. 1989 & JP–A–01 079 725 (Matsushita Electric Ind Co Ltd) 24 Mar. 1989.

Patent Abstracts of Japan, vol. 009, No. 304 (P–409) 30 Nov. 1985 & JP–A–60 136 716 (Nihon Seiki KK) 20 Jul. 1985.

Patent Abstracts of Japan, vol. 010, No. 080 (P–441) 29 Mar. 1986 & JP–A–60 217 341 (Citizen Tokei KK) 30 Oct. 1985.

IBM Technical Disclosure Bulletin, vol. 33, No. 18, Jun. 1990, New York, US, pp. 199–200, XP000122861, "Controlled Two–and Four–Domain Twisted Nematic Liquid Crystal Displays".

Yang, "Two–Domain 80°–Twisted Nematic Liquid Crystal Display for Grayscale Applications", Japanese Journal of Applied Physics, Letters, vol. 31, No. 11B, Nov. 1992, Tokyo JP, pp. L1603–1605, XP00415007.

Takatori et al, "A Complementary TN LCD with Wide–Viewing–Angle Grayscale", Japan Display '92, pp. 591–594 (no month).

Kamada et al, "Wide Viewing Angle Full–Color TFT LCDs", Japan Display '92, p. 886 (no month).

Patent Abstracts of Japan, vol. 014, No. 230 (P–1048) 16 May 1990 & JP–A–02 055 330 (Matsushita Electric Ind Co. Ltd.) 23 Feb. 1990.

Patent Abstracts of Japan, vol. 17, No. 631 (P–1648) 22 Nov. 1993 & JP–A–05 203 951 (NEC Corp) 13 Aug. 1993.

Patent Abstracts of Japan, vol. 017, No. 611 (P–1641) 10 Nov. 1993 & JP–A–05188374 (Matsushita Electric Ind Co Ltd) 30 Jul. 1993.

Patent Abstracts of Japan, vol. 017, No. 265 (P–1542) 24 May 1993 & JP–A–05 005 886 (Matsushita Electric Ind Co Ltd) 14 Jan. 1993.

Patent Abstracts of Japan, vol. 011, No. 097 (P–560) 26 Mar. 1987 & JP–A–61–249 021 (Citizen Watch Co Ltd) 6 Nov. 1986.

Patent Abstracts of Japan, vol. 013, No. 361 (P–917) 11 Aug. 1989 & JP–A–01 120 531 (Alps Electric Co Ltd) 12 May 1989.

Patent Abstracts of Japan, vol. 013, No. 361 (P–917) 11 Aug. 1989 & JP–A–01 120 533 (Alps Electric Co Ltd) 12 May 1989.

Koike et al, "A Full–Color TFT–LCD with a Domain–Divided Twisted–Nematic Structure", SID 1992 International Symposium—Digest of Technical Papers, May 1992, Playa De Rey, CA, pp. 798–802.

Patent Abstracts of Japan, vol. 011, No. 373 (P–643) 5 Dec. 1987 & JP–A–62 144 133 (Seiko Epson Corp) 27 Jun. 1987.

FIG.9
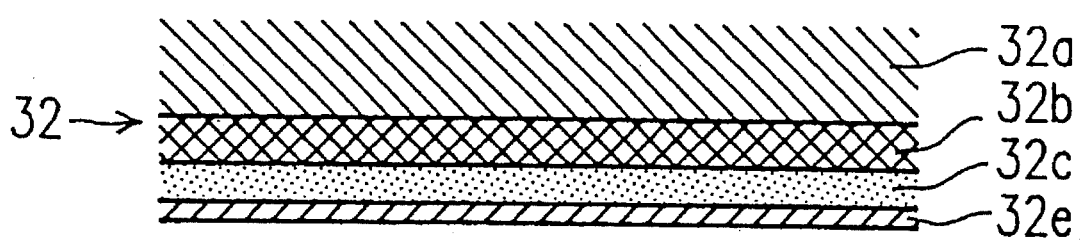
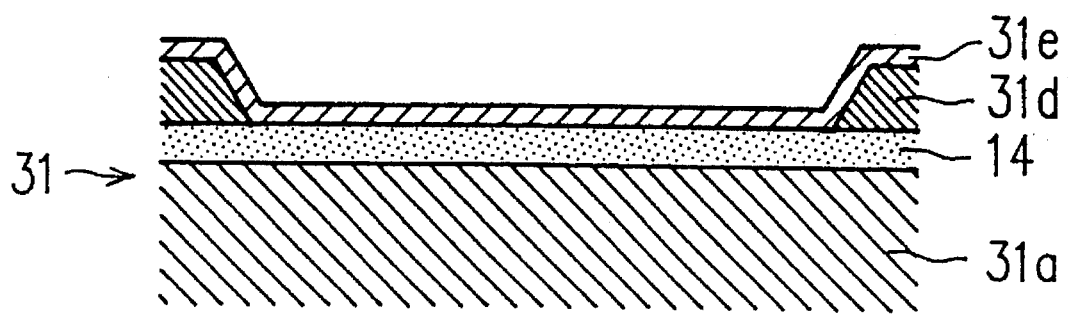

ized as possible in the initial state. In order to regularly arrange the liquid crystal molecules in the initial state, the surface conditions of the substrates which sandwich the liquid crystal layer should regulate the interactions between the liquid crystal molecules and the surfaces.

LIQUID CRYSTAL DISPLAY APPARATUS HAVING REGIONS WITH DIFFERENT PRETILT ANGLES

BACKGROUND OF THE INVENTION

1. Field of the Invention

The present invention relates to a liquid crystal display apparatus with a wide viewing angle and a method for producing the same.

2. Description of the Related Art

In a liquid crystal display (LCD), a liquid crystal layer including liquid crystal molecules is provided between a pair of substrates. When the orientation direction of the liquid crystal molecules is changed, the birefringence of the liquid crystal layer is also changed. By utilizing the change in the refractive index, the LCD performs the display. Accordingly, it is important that the liquid crystal molecules are arranged as regularly as possible in the initial state. In order to regularly arrange the liquid crystal molecules in the initial state, the surface conditions of the substrates which sandwich the liquid crystal layer should regulate the interactions between the liquid crystal molecules and the surfaces.

In the method for performing such a regulation which is currently the most widely used, material for a liquid crystal alignment film is applied to each of the surfaces of the substrates which face the liquid crystal layer. The applied material is dried and cured, so as to form the alignment film. Thereafter, the surface of the alignment film is rubbed. Thus, the liquid crystal molecules can be aligned in the rubbing direction. The rubbing treatment is unidirectionally performed on the entire substrate, so that the liquid crystal molecules in the liquid crystal layer which are in the vicinity of the substrate surface are aligned in one direction. In addition, the tilt angles (i.e., pretilt angles) of the liquid crystal molecules in the vicinity of the substrate with respect to the substrate surface are substantially equal to each other.

In an LCD which uses thin film transistors (TFTs) as switching elements, i.e., in a TFT-LCD, the construction of a twisted nematic (TN) type liquid crystal layer is adopted (an LCD of the TN mode). In such an LCD of the TN mode, the liquid crystal molecules between the pair of substrates are continuously twisted by 90° along the direction perpendicular to the surfaces of the substrates, by means of the alignment films formed in the inward-facing surfaces of the substrates.

FIG. 18 is a plan view of an exemplary TN type LCD, and FIG. 19A shows a cross section of a picture element portion of the TN type LCD. The LCD is a TFT-LCD of an active matrix type. As is shown in FIG. 19A, a liquid crystal layer 133 is sandwiched between substrates 131 and 132 which are provided so as to face each other. The substrates 131 includes a glass substrate 131a on which scanning lines 112 and signal lines 113 are formed so as to cross each other as shown in FIG. 18. In the vicinity of the crossings of the scanning lines 112 and the signal lines 113, thin film transistors (TFTs) 120 as nonlinear switching elements are formed. In areas enclosed by the scanning lines 112 and the signal lines 113, pixel electrodes 110 are formed, respectively, in such a manner that part of each pixel electrode 110 and the scanning line 112 are overlapped. The area 118 in which the pixel electrode 110 and the scanning line 112 are overlapped functions as an additional capacitance. Each of the TFTs 120 includes a gate electrode 115 which is branched from a scanning line 112, a source electrode 116 which is branched from a signal line 113, and a drain electrode 117 for connecting the TFT 120 to a pixel electrode 110. Over the glass substrate 131a on which the above-mentioned elements are formed, an insulating protective film 131d and an alignment film 131e are formed in this order.

The other substrate 132 also has a glass substrate 132a on which a color filter 132b and a transparent electrode 132c are formed in this order. Over the glass substrate 132a on which the above-mentioned elements are formed, an insulating protective film (not shown) and an alignment film 132e are formed in this order. The alignment film can also function as the insulating protective film.

In the liquid crystal layer 133 sandwiched between the above-described substrates 131 and 132, the liquid crystal molecules are aligned so that the orientation directions are continuously twisted by 90° along the direction perpendicular to the surfaces of the substrates. A liquid crystal molecule 133a near the center position along the direction perpendicular to the surfaces of the substrates has a predetermined angle with respect to the substrate surface. The substrates 131 and 132 are sealed at their ends by a resin or the like (not shown), and a peripheral circuit or the like for driving the liquid crystal is externally mounted. LCDs which are of types other than the active matrix type have the same construction as that described above.

In the TN type LCD, by the application of a voltage across the substrates 131 and 132, an electric field is generated in a direction perpendicular to the surfaces of the substrates 131 and 132. In accordance with the dielectric anisotropy of liquid crystal, the liquid crystal molecules stand. By aligning the liquid crystal molecules in parallel to the direction of the electric field, the birefringence of the liquid crystal layer 133 is varied. If the direction of the electric field is perpendicular to the direction to which the liquid crystal molecules stand during no voltage application, that is, if the pretilt angle is 0, the direction to which the liquid crystal molecules stand is not uniquely determined. As a result, a disclination line is generated between liquid crystal domains having different standing directions in response to the electric field. Such a disclination line degrades the display quality. Thus, in order to prevent the generation of the disclination line, as shown in FIG. 19A, the liquid crystal molecules are previously set to be tilted (i.e., to have a pretilt angle).

FIG. 19B shows the initial orientation of the liquid crystal when the liquid crystal panel shown in FIG. 19A is viewed from the side of the substrate 132 which is the upper one in FIG. 19A. Vector a in FIG. 19B indicates the rubbing direction of the alignment film 132e, vector b indicates the rubbing direction of the alignment film 131e. The liquid crystal molecules in the vicinity of each of the alignment films 131e and 132e are aligned along the respective rubbing direction (a or b in FIG. 19B) with a pretilt angle 6. The rubbing directions a and b forms an angle of 90° therebetween (the twist angle θt=90° in FIG. 19B). The liquid crystal molecules in the liquid crystal layer 133 are continuously twisted by 90° along the thickness direction of the liquid crystal layer 133. Accordingly, the liquid crystal molecule 133a near the middle position in the thickness direction of the liquid crystal layer 133 is also tilted by the angle δ with respect to the substrates 131 and 132. The orientation direction of the liquid crystal molecule 133a near the middle position is indicated by vector c in FIG. 19B. The vector c divides the twist angle θt into two equal angles.

Herein, the plus side of the viewing angle θv in FIG. 19A (the side indicated by θ1) is referred to as a positive viewing direction, and the minus side of the viewing angle θv in FIG.

19A (the side indicated by θ2) is referred to as a negative viewing direction. Specifically, the direction in which the liquid crystal panel is viewed from the viewing point on the right side of the vertical broken line in FIG. 19B (i.e., the line which is perpendicular to the orientation direction c of the liquid crystal molecule near the center position of the liquid crystal layer, and which divides the liquid crystal panel into two equal parts) is referred to as the positive viewing direction. The in-plane orientation direction of the liquid crystal panel of the liquid crystal molecule 133a positioned near the center of the liquid crystal layer (c in FIG. 19B) is referred to as a reference orientation direction. As is seen from FIG. 19B, the reference orientation direction divides the twist angle θt of the liquid crystal layer 133 into two equal angles. Also, the minus direction of c is referred to as a reference viewing direction v. That is, the reference viewing direction v is the representative positive viewing direction.

Also herein, an imaginary clockface (dial) is drawn on the liquid crystal panel, and the orientation direction of liquid crystal in the liquid crystal layer is indicated by the clock representation method. Specifically, in the construction in which the display on the liquid crystal panel is actually viewed by a viewer, the upper side of the liquid crystal panel is represented as 12 o'clock, the lower side thereof is represented as 6 o'clock. In a similar way, the orientation direction of the liquid crystal layer is represented as the time in the imaginary clock indicated by the reference orientation direction of the liquid crystal layer in the liquid crystal panel. For example, the liquid crystal layer having the reference orientation direction c as shown in FIG. 19B is represented in such a manner as to "be oriented at 3 o'clock" in the construction in which the front side of the figure sheet is regarded as the upper side of the liquid crystal panel.

The TN mode LCD, since the liquid crystal molecules are aligned in the above-described manner, there occurs a phenomenon in which the contrast is different depending on the angle at which the LCD is viewed. The reasons why the contrast changes will be described below.

FIG. 20 shows an exemplary applied voltages to transmittance characteristics in a normally white mode of an LCD in which light is transmitted during the no voltage application so as to perform a white display.

In FIG. 20, the solid line L1 shows the applied voltage to transmittance characteristic when the LCD shown in FIG. 19A is viewed in the direction perpendicular to the surfaces of the substrates (θv=0°). In this case, as the applied voltage value becomes high, the transmittance of light is decreased. When the voltage value reaches a specific value, the transmittance becomes substantially equal to zero. Accordingly, even when a much higher voltage is applied, the transmittance remains at substantially zero.

When the viewing angle is inclined from the direction perpendicular to the substrate face to the positive viewing direction, the applied voltage to transmittance characteristic is varied as is shown by solid line L2 in FIG. 20. Specifically, as the applied voltage becomes higher, the transmittance is decreased to some extent. When the applied voltage exceeds a specific value, the transmittance is increased. Then, the transmittance is gradually decreased. Therefore, when the viewing angle is inclined in the positive viewing direction, there occurs a phenomenon in that the black and the white (the negative and positive) of the image are inverted at a specific angle. This phenomenon occurs because the apparent birefringence of liquid crystal molecules having optical anisotropy is varied depending on the viewing angle.

Referring to FIGS. 21A to 21C, the phenomenon will be described in detail. As is shown in FIG. 21A, when the applied voltage is zero or a relatively lower voltage, the center molecule 133a of the liquid crystal layer is observed in the form of an ellipse by the viewer 137 positioned in the positive viewing direction. As the applied voltage is gradually increased, the center molecule 133a is moved in such a manner that the longer axis becomes aligned along the direction of the electric field, i.e., the direction perpendicular to the substrate face. Accordingly, the center molecule 133a is momentarily observed in the form of a circle by the viewer 137, as is shown in FIG. 21B. As the voltage is further increased, the center molecule 133a becomes substantially in parallel to the electric field direction. As a result, the center molecule 133a is observed again in the form of an ellipse by the viewer 137, as is shown in FIG. 21C. In this way, the inversion phenomenon occurs.

If the viewing angle is tilted in the negative viewing direction, the variation of the light transmittance with respect to the applied voltage is relatively small as compared with the case of being viewed from the direction perpendicular to the substrates, as is shown by solid line L3 in FIG. 20. As a result, when the LCD is viewed from the negative viewing direction, the inversion phenomenon does not occur, but the contrast is greatly degraded.

In the TN mode LCD, the inversion phenomenon when viewed from the positive viewing direction and the degradation of contrast when viewed from the negative viewing direction cause serious problems for the viewer, and they result in doubts about the display properties of the LCD.

As to techniques for improving the inversion phenomenon, JAPAN DISPLAY '92, pages 591–594, and page 886 describe the following two methods. In one method, the surface of the alignment film is unidirectionally rubbed, and then a resist is deposited on a part of the alignment film. Then, the rubbing is performed to the portion which is not covered with the resist in the direction reversed from the previous rubbing direction. Thereafter, the resist is removed. As a result, one and the same liquid crystal cell includes a different orientation direction of liquid crystal molecules in the vicinity of the center of the liquid crystal layer. In the other method, polyimide alignment films made of different compositions are juxtaposed and then they are subjected to the rubbing treatment. As a result, a plurality of pretilt angles are formed depending on the compositions thereof. According to these methods, two types of regions having opposite reference orientation directions are formed in one and the same cell, so that the viewer can mixedly observe the viewing characteristics in both directions. As a result, the inversion phenomenon when viewed from the positive viewing direction and the significant reduction of the contrast when viewed from the negative viewing direction are reduced and improved.

As described above, the viewing characteristics in the positive viewing direction and in the negative viewing direction are made uniform, but there exists another viewing characteristic in the direction perpendicular to the two reference orientation directions which are opposite to each other by 180° (i.e., in 6 o'clock or 12 o'clock direction when the two reference orientation directions are regarded as 3 o'clock and 9 o'clock direction). The viewing characteristic in the perpendicular direction is different from the viewing characteristics in the positive and negative viewing directions. The above methods cannot make the entire viewing characteristics uniform. In the above-described methods, regions having different aligning conditions are formed on both alignment films, so that it is necessary to align the boundary between the regions having different aligning conditions on one substrate with the boundary on the other substrate when the substrates are attached to each other. However, it is extremely difficult to precisely align the boundaries with each other in the actual process. Thus, it is necessary to form a light blocking film in view of the possible deviation of the alignment of boundaries. This causes the opening ratio to be decreased.

Display apparatuses have various applications, so it is desired that the screen display can attain equal viewing characteristics for wide angles in all viewing directions. There may be cases where equal viewing characteristics for wide angles are required in three directions (e.g., at 3 o'clock, 6 o'clock, and 9 o'clock directions) or where equal viewing characteristics for wide angles are required in two directions (e.g., at 3 o'clock and 6 o'clock directions). Thus, it is desirable that viewing characteristics required for the desired application can be obtained.

In another attempt to eliminate the inversion phenomenon when viewed from the positive viewing direction and the degradation of contrast when viewed from the negative viewing direction, a rectangular region 119 as shown in FIG. 18 in which the orientation direction of the liquid crystal molecule 133a in the vicinity of the center of the liquid crystal layer 133 is different from that in the other region is formed in the picture element shown by a broken line in FIG. 18. In more detail, two regions having reference orientation directions which are different from each other by 180° are formed in one picture element, so that the contrast degradation when viewed from the negative viewing direction is compensated, and the inversion phenomenon when viewed from the positive viewing direction is suppressed.

However, in the case where one picture element has liquid crystal layer regions having different reference orientation directions formed therein, as the time elapses, the aligning condition of one liquid crystal layer region may be absorbed by the aligning condition of the other liquid crystal layer region. In addition, in the boundary area between the liquid crystal layer regions, a disclination line occurs. This causes the contrast to be degraded.

SUMMARY OF THE INVENTION

The liquid crystal display apparatus of this invention includes a first substrate and a second substrate disposed to face each other; a liquid crystal layer sandwiched between the first substrate and the second substrate; and a first alignment film formed between the liquid crystal layer and the first substrate, and a second alignment film formed between the liquid crystal layer and the second substrate, wherein the liquid crystal layer includes a plurality of liquid crystal layer regions having aligning conditions which are different from each other, the plurality of liquid crystal layer regions including a first liquid crystal layer region and a second liquid crystal layer region, and wherein an orientation direction in a substrate plane of liquid crystal molecules in the vicinity of the center of the first liquid crystal layer region is different from an orientation direction in the substrate plane of liquid crystal molecules in the vicinity of the center of the second liquid crystal layer region, substantially by 90°.

In one embodiment of the invention, liquid crystal molecules in the second liquid crystal layer region are twisted in a direction opposite to a direction in which liquid crystal molecules in the first liquid crystal layer region are twisted.

In another embodiment of the invention, a surface condition of the first alignment film is different from a surface condition of the second alignment film in the first liquid crystal layer region, and a surface condition of the first alignment film is substantially the same as a surface condition of the second alignment film in the second liquid crystal layer region.

In another embodiment of the invention, a pretilt angle of the first alignment film is different from a pretilt angle of the second alignment film in the first liquid crystal layer region, and a pretilt angle of the first alignment film is substantially the same as a pretilt angle of the second alignment film in the second liquid crystal layer region. The pretilt angle of the first alignment film and the pretilt angle of the second alignment film in the first liquid crystal layer region may be smaller than 20°, and a difference between the pretilt angles of the first and the second alignment films in the first liquid crystal layer region may be 1.5° or more.

In another embodiment of the invention, the plurality of liquid crystal layer regions further includes a third liquid crystal layer region, and an orientation direction in the substrate plane of liquid crystal molecules in the vicinity of the center of the third liquid crystal layer region is different from the orientation direction in the first liquid crystal layer region by 180°, and different from the orientation direction in the second liquid crystal layer region by 90°. A pretilt angle of the first alignment film and a pretilt angle of the second alignment film in the third liquid crystal layer region may be smaller than 20°, and a difference between the pretilt angles of the first and the second alignment films in the third liquid crystal layer region may be 1.5° or more. The pretilt angle of the first alignment film may be larger than the pretilt angle of the second alignment film in the first liquid crystal layer region, and the pretilt angle of the first alignment film may be smaller than the pretilt angle of the second alignment film in the third liquid crystal layer region. Alternatively, the pretilt angle of the first alignment film may be smaller than the pretilt angle of the second alignment film in the first liquid crystal layer region, and the pretilt angle of the first alignment film may be larger than the pretilt angle of the second alignment film in the third liquid crystal layer region.

In another embodiment of the invention, the second liquid crystal layer region is formed between the first liquid crystal layer region and the third liquid crystal layer region. The first, the second, and the third liquid crystal layer regions may have substantially equal areas. Alternatively, an area of the second liquid crystal layer region is smaller than an area of each of the first and the third liquid crystal layer regions.

In another embodiment of the invention, a surface condition of the first alignment film in the first liquid crystal layer region is substantially equal to a surface condition of the first alignment film in the second liquid crystal layer region, and a surface condition of the second alignment film in the first liquid crystal layer region is different from a surface condition of the second alignment film in the second liquid crystal layer region. A pretilt angle of the first alignment film may have an intermediate value between a pretilt angle of the second alignment film in the first liquid crystal layer region and a pretilt angle of the second alignment film in the second liquid crystal layer region.

In another embodiment of the invention, a surface condition of the first alignment film in the second liquid crystal layer region is substantially equal to a surface condition of the first alignment film in the first liquid crystal layer region, and a surface condition of the second alignment film in the second liquid crystal layer region is substantially equal to a surface condition of the second alignment film in the third liquid crystal layer region.

In another embodiment of the invention, the first alignment film has equal surface conditions in all of the first, the second, and the third liquid crystal layer regions, and the second alignment film has different surface conditions among the first, the second, and the third liquid crystal layer regions.

In another embodiment of the invention, pretilt angles of the second alignment film in the first, the second, and the third liquid crystal layer regions are different from each other.

In another embodiment of the invention, each of the plurality of liquid crystal layer regions corresponds to one pixel region.

In another embodiment of the invention, the plurality of liquid crystal layer regions are formed in one pixel region.

In another embodiment of the invention, each of the plurality of liquid crystal layer regions are continuously formed over a plurality of pixel regions.

In another embodiment of the invention, an orientation direction in the substrate plane of liquid crystal molecules which are in contact with one of the first alignment film and the second alignment film is substantially parallel to a boundary between the plurality of liquid crystal layer regions.

In another embodiment of the invention, the liquid crystal display apparatus further includes a light blocking film located on the boundary between the plurality of liquid crystal layer regions.

In another embodiment of the invention, a nonlinear element is formed in the pixel region, and the boundary is disposed at a position remotest from the nonlinear element.

In another embodiment of the invention, a nonlinear element is formed in the pixel region, and the light blocking film is formed of an opaque material which constitutes the nonlinear element.

According to another aspect of the invention, a method for producing a liquid crystal display apparatus comprising a first substrate and a second substrate disposed to face each other and liquid crystal sandwiched between the first substrate and the second substrate is provided. The method includes: a step of forming a first alignment film on the first substrate, and forming a second alignment film on the second substrate; a surface treatment step of forming a plurality of portions having surface conditions which are different from each other, on at least one of the first alignment film and the second alignment film; and an assembly step of attaching the first substrate to the second substrate, and injecting the liquid crystal between the first substrate and the second substrate, so as to form a plurality of liquid crystal layer regions having different orientation directions in a substrate plane of liquid crystal molecules in the vicinity of the center of the liquid crystal along a thickness direction of the liquid crystal between the first and the second substrates, wherein the plurality of liquid crystal layer regions includes a first liquid crystal layer region and a second liquid crystal layer region, and an orientation direction in the substrate plane of liquid crystal molecules in the vicinity of the center of the first liquid crystal layer region is different from an orientation direction in the substrate plane of liquid crystal molecules in the vicinity of a center of the second liquid crystal layer region, substantially by 90°.

In one embodiment of the invention, the surface treatment step includes a step of forming a plurality of portions having different pretilt angles by partially changing the surface condition of at least one of the first and the second alignment films.

In another embodiment of the invention, the step of forming the plurality of portions having different pretilt angles includes a step of selectively irradiating the at least one of the first and the second alignment films with ultraviolet rays.

In another embodiment of the invention, the step of forming the plurality of portions having different pretilt angles includes a step of bringing the at least one of the first and the second alignment films into contact with one of an acid solution, an alkaline solution, and solutions containing these as main components.

In another embodiment of the invention, the step of forming the plurality of portions having different pretilt angles includes a step of irradiating the at least one of the first and the second alignment films with a plasma of a gas selected from a group consisting of $O_2$, Ar, and Kr.

In another embodiment of the invention, the method further includes a step of forming an underlying film on each of the first and the second substrates, prior to the step of forming the first and the second alignment films, wherein the surface treatment step includes a step of making a part of at least one of the underlying films having different degrees of roughness, and a step of forming the first and the second alignment films on the underlying films, thereby changing a surface condition of at least one of the first and the second alignment films.

In another embodiment of the invention, the step of making different degrees of roughness includes a step of selectively irradiating the underlying film with ultraviolet rays.

In another embodiment of the invention, the step of making different degrees of roughness includes a step of bringing the underlying film into contact with one of an acid solution, an alkaline solution, and solutions containing these as main components.

In another embodiment of the invention, the step of making different degrees or roughness includes a step of irradiating the underlying film with a plasma of a gas selected from a group consisting of $O_2$, Ar, and Kr.

In another embodiment of the invention, the step of making different degrees of roughness includes a step of forming an insulating film on a predetermined area of a surface of the underlying film.

In another embodiment of the invention, the step of making different degrees of roughness includes a step of forming the different degrees of roughness in at least one of the underlying films by photolithography.

In another embodiment of the invention, in the step of forming the first and the second alignment films on the underlying films, a surface condition of at least one of the first and the second alignment films is controlled by changing a thickness of the at least one of the first and the second alignment films.

In another embodiment of the invention, the plurality of liquid crystal layer regions further includes a third liquid crystal layer region, and an orientation direction in the substrate plane of liquid crystal molecules in the vicinity of the center of the third liquid crystal layer region is different from the orientation direction in the first liquid crystal layer region substantially by 180°, and different from the orientation direction in the second liquid crystal layer region substantially by 90°.

In another embodiment of the invention, the first alignment film includes a first and a second portions having different pretilt angles, and the second alignment film includes a third and a fourth portions having different pretilt angles, and wherein the method further includes a step of positioning the first and the second substrates so that the second portion of the first alignment film is divided by a boundary between the third and the fourth portions of the second alignment film.

In another embodiment of the invention, in the assembly step, the first and the second substrates are assembled so as to adapt to liquid crystal having a twisted property in a direction opposite to a direction in which the injected liquid crystal is twisted, whereby the twisted directions in the plurality of liquid crystal layer regions are different from each other.

In the liquid crystal display apparatus of the invention, the liquid crystal layer has a plurality of regions having different orientation directions of liquid crystal molecules in the vicinity of the center of the liquid crystal layer along the thickness direction thereof. In more detail, in the liquid crystal display apparatus of the invention, there exist both a liquid crystal layer region in which the aligning condition of liquid crystal molecules in the vicinity of one substrate is different from that in the vicinity of the other substrate, and a liquid crystal layer region in which the aligning condition of liquid crystal molecules in the vicinity of one substrate is the same as that in the vicinity of the other substrate. In another case, there is no liquid crystal layer region in which the aligning condition of liquid crystal molecules in the vicinity of one substrate is the same as that in the vicinity of the other substrate, but there only exists liquid crystal layer regions in which the aligning condition of liquid crystal molecules in the vicinity of one substrate is different from that in the vicinity of the other substrate. The orientation direction of liquid crystal molecules in the vicinity of the center of each liquid crystal layer region is regulated by a combination of the pretilt angles of liquid crystal molecules which are in contact with the alignment films. The viewing characteristics in the two reference viewing directions which are opposite to each other by 180° are realized by a combination of different pretilt angles between the substrates. The viewing characteristic in a reference viewing direction perpendicular to these reference viewing directions is realized by a combination of equal pretilt angles. Since the liquid crystal display apparatus of this invention has the above-described construction, the viewing characteristics in two or three directions can be made uniform.

Between adjacent liquid crystal layer regions having different aligning conditions, a liquid crystal layer region having equal pretilt angles on the pair of substrates is formed. The liquid crystal layer region having equal pretilt angles on the pair of substrates has a smaller area than the liquid crystal layer region having different aligning conditions. As the result of the construction, at the boundary between the different aligning conditions, there is no region in which the liquid crystal molecules do not stand up. Thus, a disclination line is not generated.

In the liquid crystal display apparatus of the invention, the boundary between different aligning conditions on one substrate is disposed so as to divide one aligning condition on the other substrate. Thus, it is unnecessary to precisely align the boundaries with each other when the substrates are attached to each other during panel assembly. Therefore, it is unnecessary to form a black matrix in view of the misalignment at the boundary, unlike the case in which the boundaries are aligned with each other.

According to the invention, the boundaries between a plurality of liquid crystal layer regions having different aligning conditions is formed continuously over at least two picture elements, so that the free energy included in the boundary is decreased. Thus, the absorption of one aligning condition to another aligning condition can be prevented.

The boundary between a plurality of liquid crystal layer regions having different orientation directions in one picture element is parallel to the orientation direction of liquid crystal molecules which are in contact with one substrate, so that the disorder of the liquid crystal orientation is suppressed. As a result, the generation of a disclination line can be suppressed.

If the boundary is covered with a light blocking film, the covered portion does not contribute the display, irrespective of the generation of a disclination line.

If the light blocking film is formed of the same material as that for the nonlinear element, additional processing is not required.

Thus, the invention described herein makes possible the advantages of (1) providing a liquid crystal display apparatus having a wide viewing angle with an improved display quality in which the viewing performance can be effectively improved, and a method for producing the liquid crystal display apparatus, and (2) providing a liquid crystal display apparatus in which positive and negative viewing directions are readily formed in one and the same cell and a method for producing the liquid crystal display apparatus.

These and other advantages of the present invention will become apparent to those skilled in the art upon reading and understanding the following detailed description with reference to the accompanying figures.

BRIEF DESCRIPTION OF THE DRAWINGS

FIG. 9 is a cross-sectional view of the LCD shown in FIG. 8.

DESCRIPTION OF THE PREFERRED EMBODIMENTS

Hereinafter, the present invention will be described by way of illustrative examples.

EXAMPLE 1

Figure 1A:
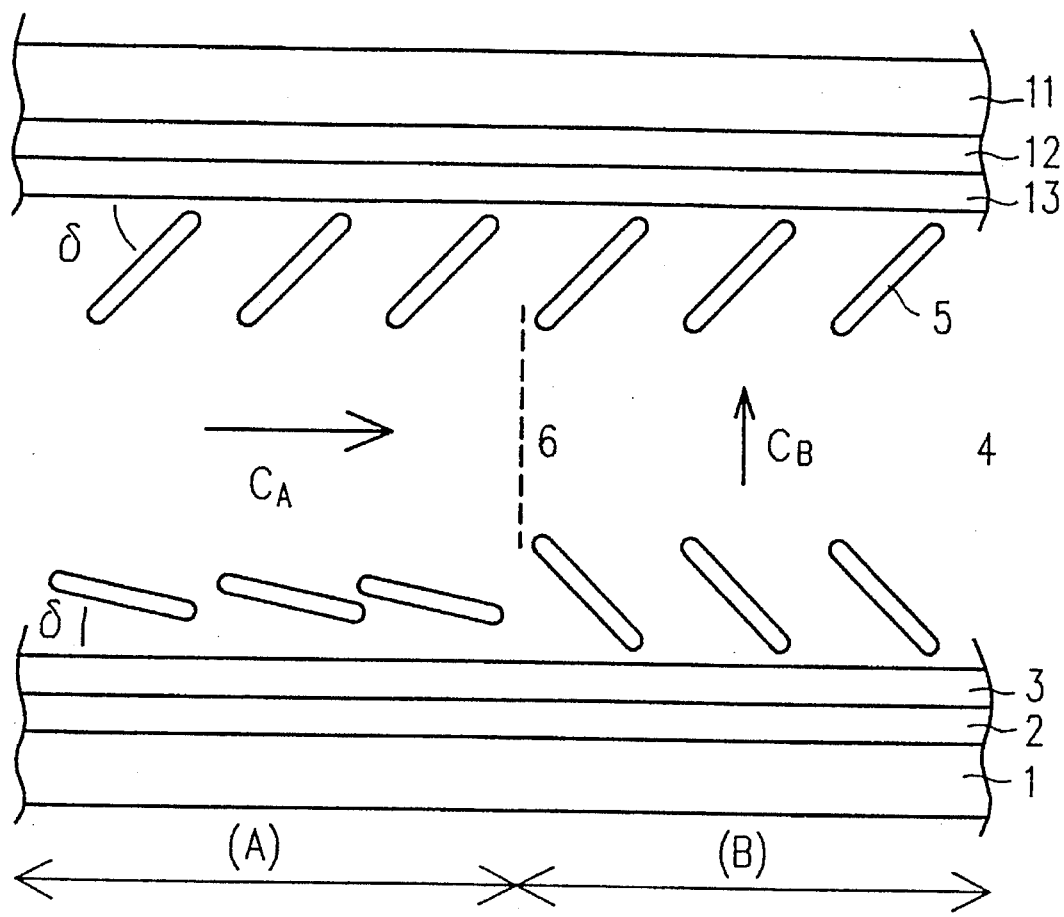
FIG. 1A is a cross-sectional view showing a first example of an LCD of the invention.

In Example 1, so as to form two liquid crystal layer regions with different pretilt angles, portions having different pretilt angles are formed on one of the alignment films formed on the inwardly-facing surfaces of a pair of substrates. FIG. 1A schematically shows the aligning conditions of liquid crystal molecules in an LCD of this example. Various switching elements and electric wirings, and the like are not essential in this application, so that they are not shown in FIG. 1A. In this example, it is assumed that each of the liquid crystal layer regions indicated by (A) and (B) corresponds to one pixel region.

The LCD includes, as shown in FIG. 1A, a transparent base substrate 1 and a transparent counter substrate 11 which is disposed so as to face the base substrate 1. Over the entire surface of the base substrate 1, a transparent electrode 2 is formed. An alignment film 3 is formed over the entire surface of the base substrate 1 so as to cover the transparent electrode 2. Over the entire surface of the counter substrate 11, a transparent electrode 12 is formed. An alignment film 13 is formed over the entire surface of the counter substrate 11 so as to cover the transparent electrode 12. The alignment films 3 and 13 are subjected to the aligning treatment (e.g., the rubbing treatment). The base substrate 1 and the counter substrate 11 are arranged in such a construction that the alignment films 3 and 13 face each other and the liquid crystal which will be sealed between the substrates 1 and 11 should be left-handed 90° twisted. Then, into a gap between the substrates 1 and 11 having the above-described construction, liquid crystal having a right-handed twist property is injected, so as to form a liquid crystal layer 4. The grades of inclination of liquid crystal molecules 5 with respect to the surfaces of the alignment films 3 and 13 in the vicinity of the interface between the liquid crystal layer 4 and the alignment film 3 and the interface between the liquid crystal layer 4 and the alignment film 13 correspond to pretilt angles δ of the liquid crystal molecules 5.

In this example, on the side of the alignment film 3 formed on the base substrate 1, the pretilt angle ι of the liquid crystal molecules 5 in the liquid crystal layer region (A) is smaller than that in the liquid crystal layer region (B). On the side of the alignment film 13 formed on the counter substrate 11, the pretilt angle δ in the liquid crystal layer region (A) is equal to that in the liquid crystal layer region (B). In addition, the pretilt angle δ on the side of the alignment film 13 formed on the counter substrate 11 is set to be larger than that in the liquid crystal layer region (A) on the side of the alignment film 3 formed on the base substrate 1.

A method for producing the LCD is now described.

Transparent electrodes 2 and 12 of ITO or the like are formed on the base substrate 1 and the counter substrate 11, respectively. Alignment films 3 and 13 are formed so as to cover the transparent electrodes 2 and 12 over the entire surfaces of the base substrate 1 and the counter substrate 11, respectively. In this example, as a material of the alignment film, polyimide which makes the pretilt angle δ of liquid crystal molecules 5 to be 5° is used. Polyimide films are formed on the substrates 1 and 11 on which the transparent electrodes 2 ad 12 are formed, by spin coating, printing, or other methods. Then, the surface of the formed polyimide film is rubbed. Instead of polyimide, the alignment film may be formed of an organic material such as polyamide, polystyrene, polyamideimide, epoxyacrylate, spiranacrylate, polyurethane, or the like.

Thereafter, the polyimide film 3 on the base substrate 1 is selectively irradiated with ultraviolet rays, so as to form two types of regions in which the pretilt angles ι of liquid crystal molecules in contact with the regions are different from each other. Specifically, the portion corresponding to the liquid crystal layer region (B) of the polyimide film 3 is covered with a resist, so that only the portion corresponding to the liquid crystal layer region (A) is irradiated with the ultraviolet rays. As a result, the pretilt angle δ of the liquid crystal molecules 5 which are in contact with the irradiated portion of the polyimide film 3 becomes smaller than 5° in the portion which is not irradiated with the ultraviolet rays. In this example, the irradiation of ultraviolet rays is performed so that the pretilt angle δ of the liquid crystal molecules 5 in contact with the irradiated portion is set to be 3.5°. An area of the irradiated portion is made equal to that of the non-irradiated portion. To the polyimide film 13 on the counter substrate 11, the irradiation of ultraviolet rays is not performed, so that the pretilt angles δ are all set to be 5° on the side of the counter substrate 11.

Finally, the substrates 1 and 11 having the above-described construction are attached so as to face each other, and so as to correspond to the left-handed twist liquid crystal. Then, the liquid crystal having right-handed twist property is injected into the gap between the substrates 1 and 11. As a result, two liquid crystal layer regions, i.e., a liquid crystal layer region (A) in which the pretilt angle on the counter substrate 11 side is 5° and the pretilt angle on the base substrate 1 side is 3.5° and a liquid crystal layer region (B) in which the pretilt angles on both sides are equal to 5° are formed.

Figure 1B:
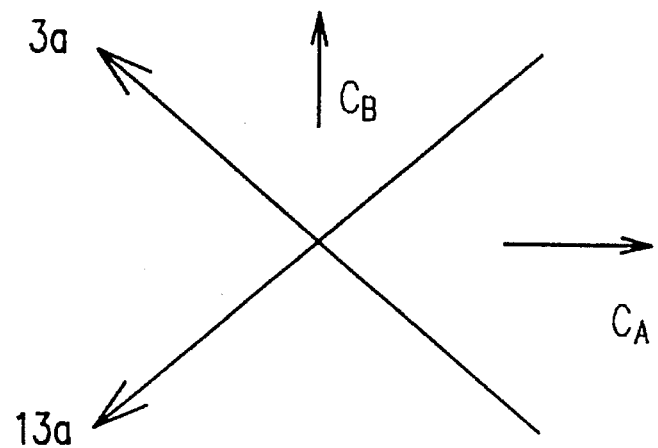
FIG. 1B shows the relationship between the rubbing direction and the reference orientation direction in the LCD shown in FIG. 1A.

FIG. 1B shows the relationship between the rubbing directions 3a and 13a on the alignment films 3 and 13 and reference orientation directions in the respective liquid crystal layer regions. In the liquid crystal cell which is obtained in the above-described manner, the orientation directions of liquid crystal molecules in the vicinity of the center of the liquid crystal layer 4 along the thickness direction thereof are set in the following manner. In the liquid crystal layer region (A) in which the pretilt angle δ on the counter substrate 11 side is larger, the liquid crystal is right-handed twisted, and the orientation direction of the liquid crystal molecules is substantially parallel to the substrate face in the vicinity of the center of the liquid crystal layer 4. During the voltage application, the standing of the liquid crystal molecules in the vicinity of the center is regulated by the alignment film 13 on the counter substrate 11 having the larger pretilt angle δ. Accordingly, the in-plane orientation direction of the liquid crystal molecules in the liquid crystal panel, i.e., the reference orientation direction is indicated by $c_A$ shown in FIG. 1A and 1B. In the liquid crystal layer region (B) in which the pretilt angles δ on both sides are equal to each other, although the liquid crystal has the right-handed twist property, the liquid crystal is regulated by the cell which is constructed so as to correspond to the left-handed twisted liquid crystal. As a result, the liquid crystal is left-handed twisted. Accordingly, during the voltage application, in FIG. 1A, the front end of each liquid crystal molecule 5 in the vicinity of the center points downwardly, and the other end thereof stands. Thus, the reference orientation direction of the liquid crystal layer region (B) is a direction $c_B$ from the front side of the figure sheet to the other side, as shown in FIGS. 1A and 1B. The direction $c_B$ is different from the reference orientation direction $c_A$ in the liquid crystal layer region (A).

In this example, in the liquid crystal layer region (A), the difference between the pretilt angle on the counter substrate 11 side and the pretilt angle on the base substrate 1 side is set to be 1.5°. If the difference between the pretilt angles is made smaller than 1.5°, a good orientation regulation by the alignment film having the larger pretilt angle cannot be performed. The maximum value of the pretilt angle (i.e., a pretilt angle obtained without the irradiation of ultraviolet rays) should be set smaller than 20°. If the pretilt angle is equal to or larger than 20°, the orientation direction of liquid crystal molecules in the vicinity of the center cannot be regulated by the alignment film having the larger pretilt angle, even when the pretilt angle on one substrate side is set to be larger than that of the other substrate side, because the orientation regulating power by the cell structure is stronger than the orientation regulating power by the alignment film having the larger pretilt angle.

In this example, the material of liquid crystal injected into the gap between the base substrate 1 and the counter substrate 11 and the combinations of the substrates 1 and 11 which are subjected to the aligning treatment are selected so that the reference orientation direction $c_A$ in the liquid crystal layer region (A) is different from the reference orientation direction $c_B$ in the liquid crystal layer region (B) by 90°. The reference orientation directions in the two regions are not necessarily selected from 3 o'clock, 6 o'clock, 9 o'clock, and 12 o'clock directions. It is sufficient that the directions are different from each other by 90°. For example, they are selected as a direction indicating 4:30 and a direction indicating 7:30. As described above, according to this example, two types of liquid crystal layer regions having different reference orientation directions by 90° are formed so as to have equal areas. Accordingly, the viewing characteristics viewed in the reference viewing directions which are different from each other by 90° are mixed at the ratio of 1:1, so that good viewing performance can be obtained.

In this example, each of the liquid crystal layer regions (A) and (B) corresponds to one pixel region. Alternatively, if one pixel region is divided into two sub-regions which correspond to the liquid crystal layer regions (A) and (B), respectively, two different reference orientation directions are formed in one pixel region. Accordingly, a finer image can be realized.

In the LCD of Example 1, the aligning condition on the counter substrate 11 side is entirely uniform, and two types of portions having different aligning conditions are provided on the base substrate 1 side. Accordingly, the liquid crystal layer 4 is divided into two types of regions having different reference orientation directions, by the boundary between the portions having different aligning conditions. Therefore, unlike the prior art in which regions having reference orientation directions different from each other by 180° are formed, it is unnecessary to align the boundary between the portions having different aligning conditions on the counter substrate side with the boundary between the portions having different aligning conditions on the base substrate side when the substrates are attached to each other. As a result, it is unnecessary to form a black matrix which was formed in view of the possible misalignment in the prior art requiring the alignment of boundaries. Therefore, the opening ratio cannot be reduced.

EXAMPLE 2

Figure 2A:
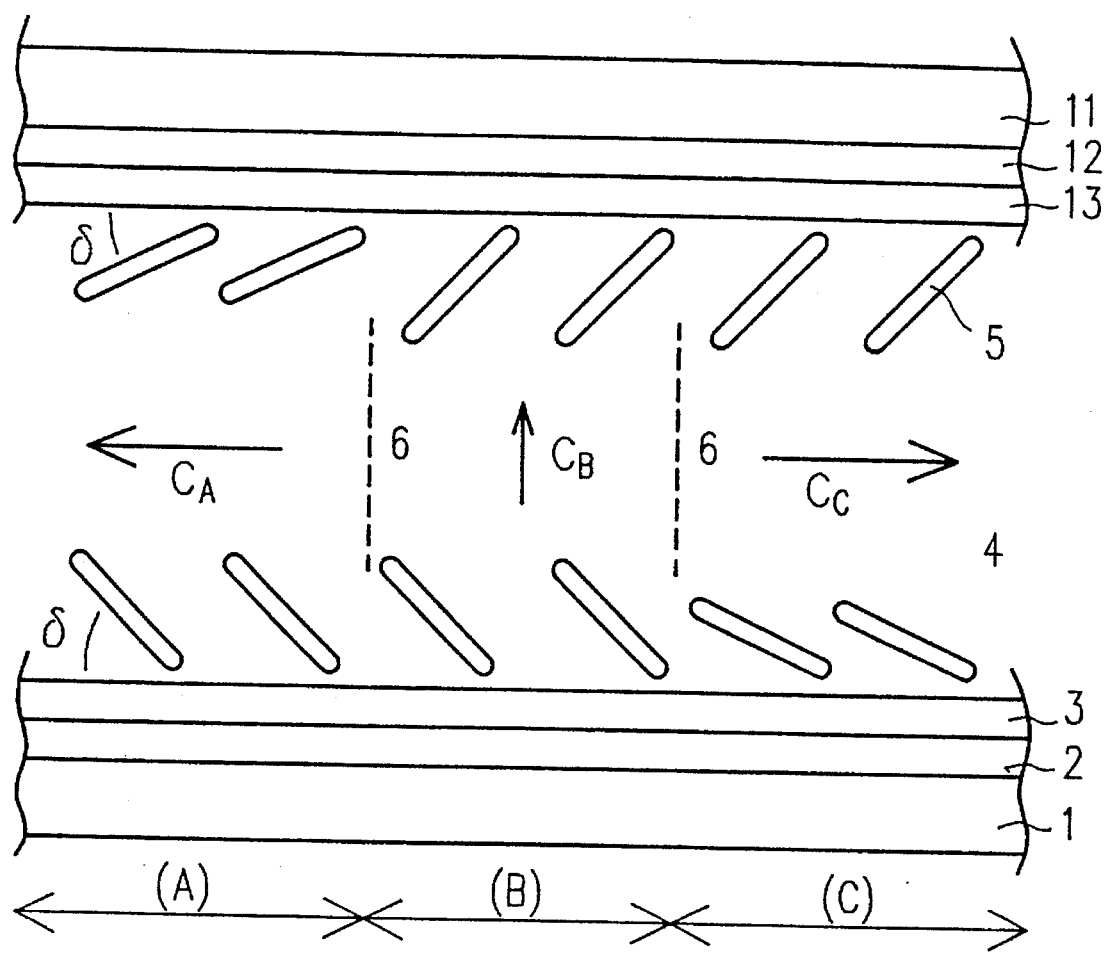
FIG. 2A is a cross-sectional view showing a second example of an LCD of the invention.

In an LCD of Example 2, three types of liquid crystal layer regions having different reference orientation directions are formed. FIG. 2A shows a cross section of the LCD of this example. In this example, two types of portions having different aligning conditions are formed on the alignment film 3 on the base substrate 1, and also two types of portions having different aligning conditions are formed on the alignment film 13 on the counter substrate 11. By the combinations of the aligning conditions of the substrates 1 and 11, three types of liquid crystal layer regions (A), (B), and (C) having different reference orientation directions are formed. In this example, it is assumed that each of the liquid crystal layer regions (A), (B), and (C) corresponds to one pixel region.

Transparent electrodes 2 and 12 are formed on the base substrate 1 and the counter substrate 11, respectively. Polyimide films are formed so as to cover the transparent electrodes 2 and 12 over the entire surfaces of the base substrate 1 and the counter substrate 11, respectively. The polyimide films are rubbed, so as to obtain alignment films 3 and 13. Thereafter, the alignment film 3 and 13 are partially covered with a resist, and then irradiated with ultraviolet rays. In this example, in both alignment films, the area of the portion which is covered with the resist is set to be twice as large as the area of the portion which is irradiated with ultraviolet rays without the resist. As a result, both in the alignment film 3 on the base substrate 1 and in the alignment film 13 on the counter substrate 11, two types of portions having different aligning conditions are formed. In this example, the same polyimide film as that used in Example 1 is used as the alignment film, so that the pretilt angle δ of liquid crystal molecules which are in contact with the portion which is not irradiated with ultraviolet rays of the polyimide film is 5°. In this example, the irradiation of ultraviolet rays is performed so that the pretilt angle of the liquid crystal molecules in contact with the irradiated portion is set to be 3.5°.

The substrates 1 and 11 having the above-described construction are attached so that the rubbing directions for the substrates 1 and 11 will correspond to the left-handed twisted liquid crystal and so that the boundary between portions having different aligning conditions on one substrate divides the portion which is not irradiated with ultraviolet rays (the portion having the larger pretilt angle) on the other substrate into two substantially equal parts. Also, the substrates 1 and 11 are attached to each other so as to set the faces on which the alignment films are formed inwardly. Finally, liquid crystal having right-handed twist property is injected into the gap between the substrates 1 and 11. As a result, a liquid crystal layer region (A) in which the pretilt angle on the counter substrate 11 side is smaller than that on the base substrate 1 side, a liquid crystal layer region (B) in which the pretilt angles on both sides are equal, and a liquid crystal layer region (C) in which the pretilt angle on the counter substrate 11 side is larger than that on the base substrate 1 side are formed.

Figure 2B:
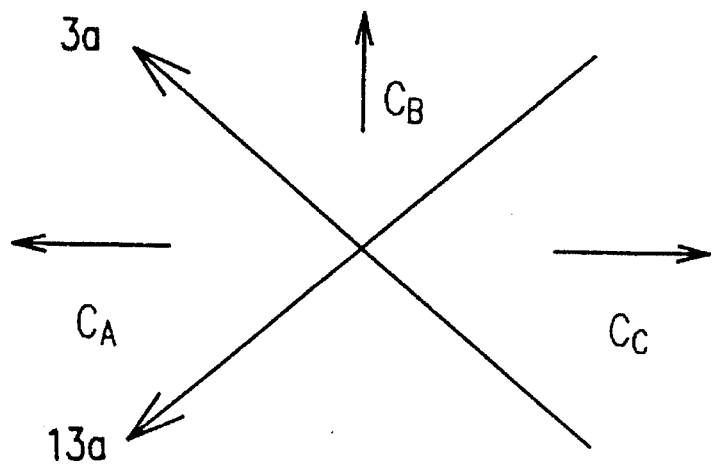
FIG. 2B shows the relationship between the rubbing direction and the reference orientation direction in the LCD shown in FIG. 2A.

FIG. 2B shows the relationships between the rubbing directions 3a and 13a on the alignment films 3 and 13 and reference orientation directions in the respective liquid crystal layer regions. In the liquid crystal cell which is obtained in the above-described manner, the orientation directions of liquid crystal molecules in the vicinity of the center of the liquid crystal layer 4 along the thickness direction thereof are set in the following manner. In the liquid crystal layer region (A), since the pretilt angle on the base substrate 1 side is larger than that on the counter substrate 11 side, the liquid crystal is right-handed twisted, and the orientation direction of the liquid crystal molecules is substantially parallel to the substrate face in the vicinity of the center of the liquid crystal layer. The in-plane orientation direction of the liquid crystal molecules in the liquid crystal panel in the vicinity of the center in the region (A) is a direction indicated by $c_A$ shown in FIGS. 2A and 2B. In the liquid crystal layer region (B) in which the pretilt angles on both sides are equal to each other, although the liquid crystal has the right-handed twist property, the liquid crystal is regulated by the cell, so as to correspond to the left-handed twisted liquid crystal. As a result, the liquid crystal is left-handed twisted. Accordingly, the reference orientation direction in the liquid crystal layer region (B) is the direction $c_B$ from the front side of the figure sheet to the other side, as shown in FIGS. 2A and 2B. In the liquid crystal layer region (C), since the pretilt angle on the counter substrate 11 side is larger than that on the base substrate 1 side, the liquid crystal is right-handed twisted, as in the liquid crystal layer region (A). However, the relationship of the magnitude between the pretilt angles on the substrates 1 and 11 in the liquid crystal layer region (C) is reversed from that in the liquid crystal layer region (A), so that the reference orientation direction $c_C$ in the liquid crystal layer region (C) is different from the reference orientation direction $c_A$ in the liquid crystal layer region (A), by 180°. In this example, the material of liquid crystal and the combinations of the substrates 1 and 11 which are subjected to the aligning treatment are selected so that the reference orientation direction $c_B$ in the liquid crystal layer region (B) is different from both the reference orientation directions $c_A$ and $c_C$ in the liquid crystal layer regions (A) and (C) by 90°.

As described above, in this example, three different reference orientation directions can be obtained in one liquid crystal cell. The three reference orientation directions are different from each other by 90°, e.g., 9 o'clock, 12 o'clock, and 3 o'clock directions. Also as described above, the substrates 1 and 11 are combined in such a manner that the boundary at which the aligning condition is changed on one substrate divides the portion which is not irradiated with ultraviolet rays on the other substrate into two equal parts. Accordingly, it is possible to obtain the liquid crystal layer regions (A), (B), and (C) which have substantially equal areas. Thus, the viewing characteristics viewed in the directions, e.g., 9 o'clock, 12 o'clock, and 3 o'clock are mixed at the ratio of 1:1:1, so that good viewing performance can be obtained.

In this example, each of the liquid crystal layer regions (A), (B), and (C) corresponds to one pixel region. Alternatively, if one pixel region is divided into sub-regions which correspond to the liquid crystal layer regions (A), (B), and (C), respectively, three different reference orientation directions are formed in one pixel region. Accordingly, a finer image can be realized.

In the LCD of Example 2, the substrates are disposed in such a manner that the boundary between the different aligning conditions on one substrate side divides one aligning condition on the other substrate side, so that it is unnecessary to align the boundaries with each other when the substrates are attached to each other and assembled into a panel. As a result, it is unnecessary to form a light blocking film which was formed in view of the possible misalignment in the prior art requiring the alignment of boundaries. Therefore, the reduction in opening ratio can be prevented.

EXAMPLE 3

Figure 3A:
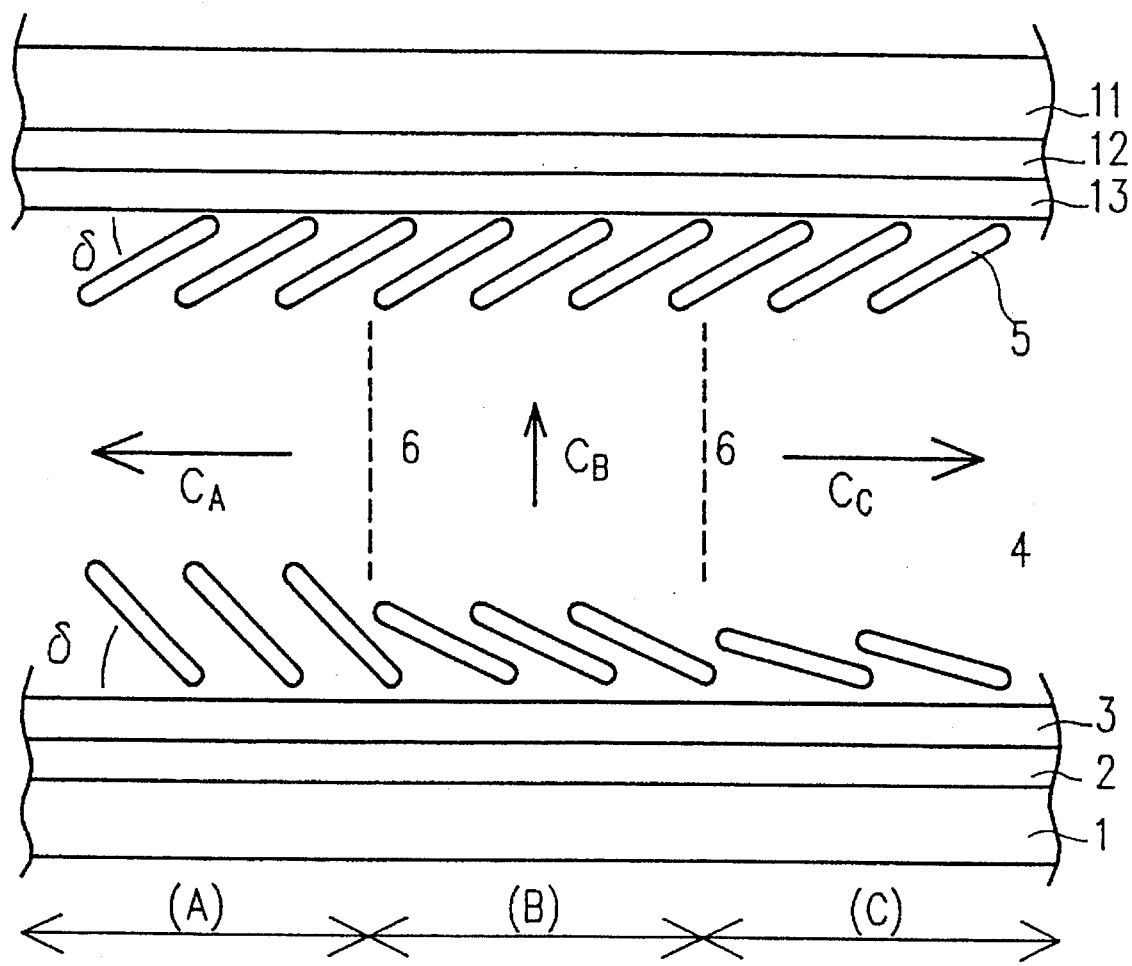
FIG. 3A is a cross-sectional view showing a third example of an LCD of the invention.

In an LCD of Example 3, three types of liquid crystal layer regions having reference orientation directions which are different from each other are formed, as in Example 2. In Example 2, the portions having different aligning conditions are formed on both sides of the base substrate i and the counter substrate 11. In Example 3, unlike Example 2, only the aligning condition on the base substrate 1 side is varied in three grades. FIG. 3A shows a cross section of the LCD of this example. Each of the liquid crystal layer regions (A), (B), and (C) corresponds to one pixel region.

A method for producing the LCD in this example is now briefly described. First, a transparent electrode 2 is formed on a base substrate 1. Then, a polyimide is applied onto the entire surface of the substrate so as to cover the transparent electrode 2, and then cured. The polyimide film is rubbed so as to obtain an alignment film 3. In this example, a polyimide film which provides a pretilt angle of 8° when it is not irradiated with ultraviolet rays is used as the alignment film 3. Then, a ⅓ portion of the polyimide film is covered with a resist, and the remaining ⅔ portion is irradiated with ultraviolet rays. In this irradiation, the intensity of ultraviolet rays is set to be 5–10 J/cm², whereby the pretilt angle δ of liquid crystal molecules which are in contact with the irradiated portion is changed from 8° to 4°. Then, a half of the irradiated portion is covered with a resist. That is, the ⅔ portion including the portion which was previously covered is now covered with the resists. The remaining ⅓ portion is irradiated with ultraviolet rays having the intensity of 5–10 J/cm². Thus, the pretilt angle δ is further decreased. In this process, the ⅓ portions which are adjacent to each other are covered with the resists. In this example, the second irradiation of ultraviolet rays results in the decrease of the pretilt angle δ of liquid crystal molecules from 4° to 1° or less.

Also, an alignment film 13 is formed on the counter substrate 11. Unlike Example 2, the alignment film 13 is not irradiated with ultraviolet rays. The alignment film 13 employed is a polyimide film which provides a pretilt angle which is equal to the middle one of the three grades of pretilt angles which are realized by the alignment film 3 on the base substrate 1, when the polyimide film is not irradiated with ultraviolet rays. In this example, as the alignment film 13, a material by which a pretilt angle of 4° is obtained when it is not irradiated with ultraviolet rays. Similarly to Examples 1 and 2, in this example, the pretilt angle δ is set to be smaller than 20°, and the difference between the pretilt angles on the base substrate 1 and the counter substrate 11 is set to be equal to or larger than 1.5°.

Figure 3B:
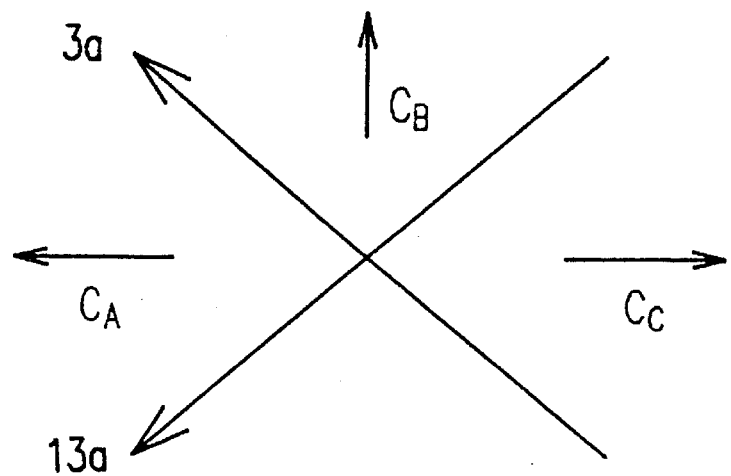
FIG. 3B shows the relationship between the rubbing direction and the reference orientation direction in the LCD shown in FIG. 3A.

Finally, the substrates 1 and 11 on which the alignment films are formed respectively are combined so as to adapt the rubbing directions 3a and 13a for the substrates 1 and 11 to the left-handed twisted liquid crystal (see FIG. 3B). Into a gap between the combined substrates 1 and 11, liquid crystal having right-handed twist property is injected. As a result, a liquid crystal layer region (A) in which the pretilt angle on the counter substrate 11 side is smaller than that on the base substrate 1, a liquid crystal layer region (B) in which the pretilt angles in both substrates are equal to 4°, and a liquid crystal layer region (C) in which the pretilt angle on the counter substrate 11 side is larger than that on the base substrate 1 side are formed.

FIG. 3B shows the relationship between the rubbing directions 3a and 13a on the alignment films 3 and 13 and reference orientation directions in the respective liquid crystal layer regions. In the liquid crystal panel which is obtained in the above-described manner, the reference orientation directions in the liquid crystal regions (A), (B), and (C) are set in the same manner as in Example 2. Specifically, in the liquid crystal layer region (A), since the pretilt angle on the base substrate 1 side is larger than that on the counter substrate 11 side, the liquid crystal is right-handed twisted, and the in-plane orientation direction in the substrate (the reference orientation direction) of the liquid crystal molecules in the vicinity of the center is the direction indicated by $c_A$. In the liquid crystal layer region (B), the reference orientation direction is the direction indicated by $c_B$. In the liquid crystal layer region (C), the reference orientation direction is the direction indicated by $c_C$. It is preferred that the twist angles, the rubbing angles and the like of liquid crystal are set so that the reference orientation direction $c_B$ in the liquid crystal layer region (B) is different from both the reference orientation directions $c_A$ and $c_C$ in the liquid crystal layer regions (A) and (C), respectively, by 90°.

In this example as well as Example 2, three different reference orientation directions can be obtained in one liquid crystal panel. As described above, the liquid crystal layer regions are formed so as to have equal areas, so the viewing characteristics viewed in the three reference viewing directions are mixed at the ratio of 1:1:1 and made uniform, so that good viewing performance can be obtained. If one pixel region is divided into a plurality of sub-regions which correspond to the three types of liquid crystal layer regions, respectively, three different reference orientation directions are formed in one pixel region. Accordingly, a finer image can be realized.

In this example similar to Example 1, the aligning condition on the counter substrate 11 side is set to be uniform, and the liquid crystal layer 4 is divided into three liquid crystal layer regions by boundaries between portions having different aligning conditions of the alignment film 3 on the base substrate 1 side. Thus, it is unnecessary to align the boundary on the base substrate 1 side with the boundary on the counter substrate 11 side when the substrates are attached to each other and assembled into a panel. As a result, it is unnecessary to form a black matrix which was formed in view of the possible misalignment in the prior art. Therefore, the reduction in the opening ratio can be prevented.

EXAMPLE 4

In Example 4, in the LCD in Examples 2 and 3, the liquid crystal layer region (B) in which the pretilt angle on the base substrate 1 side is equal to the pretilt angle on the counter substrate 11 side is provided at the boundary between the liquid crystal layer region (A) in which the pretilt angle on the base substrate 1 side is larger and the liquid crystal layer region (C) in which the pretilt angle on the base substrate 1 side is smaller. The ratio in area of the liquid crystal layer region (B) in the substrate is set to be substantially 10% of the area of the liquid crystal layer region (A) or (C). The area of the liquid crystal layer region (B) is too small to contribute to the viewing characteristics of the liquid crystal panel. Due to such a construction, it is possible to substantially prevent the generation of disclination at the boundary between liquid crystal layer regions having different aligning conditions, which constitutes a problem when a Liquid crystal layer region in which the pretilt angle on the base substrate 1 side is larger is adjacent to a liquid crystal layer region in which the pretilt angle on the base substrate 1 side is smaller, so as to form reference orientation directions which are different from each other by 180°.

In the above-described method in which the viewing performance is improved by forming reference orientation directions different from each other by 180° in one and the same panel, the disclination is generated at the boundary between the liquid crystal layer regions having different reference orientation directions, which causes the contrast to be degraded. However, in this example, in all portions at the boundary between liquid crystal layer regions having adjacent reference orientation directions, liquid crystal molecules stand, so that the disclination line is not observed. Therefore, even in the normally white mode, it is not necessary to provide a light blocking film for suppressing the light transmission due to the disclination. Thus, the opening ratio is not reduced, and hence a bright screen display can be obtained.

Next, a modification of Examples 1 to 4 will be described with reference to FIG. 4. In the modification shown in FIG. 4, the alignment film 3 on the base substrate i is partially irradiated with ultraviolet rays, so that a chemical change occurs in the surface of the irradiated portion. As a result, a portion having a smaller pretilt angle than an inherent pretilt angle is formed. On the counter substrate 11, the alignment film 13 is formed of a material having a pretilt angle which is smaller than the inherent pretilt angle of the alignment film 3 on the base substrate 1 and is larger than the pretilt angle obtained as the result of the irradiation of ultraviolet rays. At this time, as in Example 1, the alignment film 13 on the counter substrate 11 is not irradiated with ultraviolet rays. As the alignment film 3 on the base substrate 1, a polyimide film having a pretilt angle of 6° is used. The polyimide film is covered with a photomask, and then irradiated with ultraviolet rays of 10 to 30 J/cm², so that the pretilt angle is set to be 1°or a smaller angle. For the alignment film 13 on the counter substrate 11, the pretilt angle is set to be 3°.

The substrates 1 and 11 having the above-described constructions are attached to each other so that the rubbing directions are adapted to the left-hand twisted liquid crystal. Then, liquid crystal having the right-handed twist property is injected into a gap between the substrates 1 and 11. In this way, it is possible to obtain an LCD in which two grades of pretilt angles which are larger and smaller than the pretilt angle on the counter substrate 11 side are provided on the base substrate 1 side, while the aligning condition on the counter substrate 11 side is entirely uniform. The reference orientation directions in the two liquid crystal layer regions having different pretilt angles on the base substrate 1 side are different from each other by 180°. Therefore, the viewing characteristics in both the positive and negative viewing directions are mixed and made uniform in the LCD shown in FIG. 4, so that good viewing performance can be obtained. Each of the portions having different aligning conditions on the base substrate 1 side may correspond to one pixel region. Alternatively, portions having different aligning conditions are formed in one pixel region. In the latter construction, a finer image can be obtained.

Figure 4:
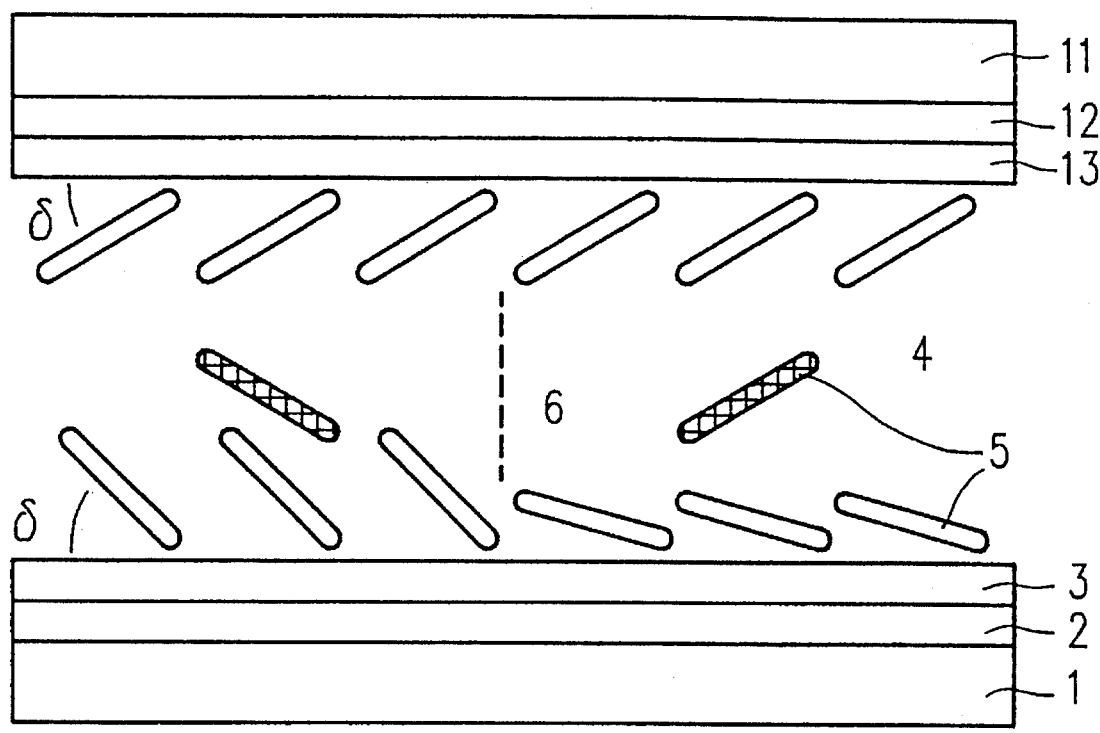
FIGS. 4 and 5 are cross-sectional views showing modifications of the LCD of the invention.

In the LCD shown in FIG. 4, the substrates are disposed in such a manner that the boundary between the different aligning conditions on one substrate side divides one aligning condition on the other substrate side, so that it is unnecessary to align the boundaries with each other when the substrates are attached to each other and assembled into a panel, unlike the prior art. As a result, it is unnecessary to form a black matrix which was formed in case of the possible misalignment. Therefore, the alignment of the substrates is the same as in the prior art, and the opening ratio is not reduced.

In cases where the partial aligning treatment cannot be performed on one substrate, a liquid crystal panel having superior viewing characteristics can be obtained according to the invention. This can be, for example, applied to the cases where a color filter is provided on the substrate. In general, a color filter has a poor light resistance, and hence the color filter is not suitable for the division of the aligning conditions with light irradiation. In addition, since a transparent electrode (ITO) is formed on the color filter, it is difficult to perform the patterning of the transparent electrode, and the like. In such a case, if it is assumed that the LCD is of the active matrix type, a selective irradiation is performed on the TFT substrate side. Thus, a region having a larger pretilt angle (the inherent pretilt angle) and a region having a smaller pretilt angle as the result of the irradiation are formed. On the color filter substrate, an alignment film having a pretilt angle which is smaller than the inherent pretilt angle of the TFT substrate side is formed. At this time, it is necessary to set the pretilt angle on the color filter substrate side larger than the smaller pretilt angle on the TFT substrate side. When these substrates are combined, the reference orientation direction of liquid crystal between the substrates is regulated by the substrate with the larger pretilt angle. Accordingly, in the liquid crystal layer region in which the pretilt angle on the TFT substrate side is larger, the reference orientation direction is regulated by the TFT substrate. In the liquid crystal layer region in which the pretilt angle on the TFT substrate side is smaller, the orientation direction is regulated by the color filter substrate. As a result, reference orientation directions different from each other by 180° can be formed in the LCD. By using this method, the aligning dividing treatment is performed for only one substrate, so that the process can be simplified.

Next, another modification will be described with reference to FIG. 5. In the LCD shown in FIG. 5, the division of aligning conditions is performed on both the alignment film 3 on the base substrate 1 and the alignment film 13 on the counter substrate 11. In this case, for example, regions having different pretilt angles a, b, and c are formed on one substrate, and regions having different pretilt angles d and e are formed on the other substrate. Herein, the pretilt angles a to e satisfy the condition of a>d>b>e>c. When such substrates are combined, a unit liquid crystal layer region is divided into four regions, and two orientation directions are alternately arranged. Therefore, it is possible to obtain a finer image as compared with the case of the light irradiation using a photomask.

In this modification, an even number of portions having different pretilt angles are formed on the alignment film on one substrate side, and an odd number of portions having different pretilt angles are formed on the alignment film on the other substrate side. Specifically, as shown in FIG. 5, two portions having different pretilt angles are formed on the alignment film 3 on the base substrate 1 side, and three portions having different pretilt angles are formed on the alignment film 13 on the counter substrate 11 side. In a method for forming three portions having different aligning conditions in the alignment film 13, as described in Example 3, a ⅓ portion of the entire surface is first covered with a photomask. Then, the remaining ⅔ portion is irradiated with ultraviolet rays of 5 J/cm$^2$. Next, a half of the irradiated portion is covered with a photomask, i.e., the total ⅔ portion including the portion which is previously covered is covered with the photomask. Then, the remaining ⅓ portion is irradiated with ultraviolet rays of 5 J/cm$^2$. As a result, a non-irradiated portion, an irradiated portion with ultraviolet rays of 5 J/cm$^2$, and an irradiated portion with ultraviolet rays of 10 J/cm$^2$ are obtained. In this modification, the employed alignment film 13 on the counter substrate 11 side is a polyimide film having a pretilt angle of 9° without the irradiation of ultraviolet rays. The polyimide film is subjected to the above-described process, so that a portion having a pretilt angle of 9°, a portion having a pretilt angle of 5°, and a portion having a pretilt angle of 1° are formed.

In the alignment film 3 on the base substrate 1 side, a half of the surface is covered with a photomask, and then the remaining portion is irradiated with ultraviolet rays. As a result, two portions having different aligning conditions are formed. As the alignment film 3 on the base substrate 1 side, a material having a pretilt angle which has a value between the largest pretilt angle and the second largest pretilt angle on the counter substrate 11 side, without the irradiation of ultraviolet rays. In this modification, a polyimide film having the inherent pretilt angle of 7° is used, and a half of the film is irradiated with ultraviolet rays of about 5 J/cm$^2$. As a result, the pretilt angle is set to be 3°.

Finally, the substrates 1 and 11 are combined in such a manner that the rubbing directions are adapted to the left-handed twisted liquid crystal and the boundary between different aligning conditions on the base substrate 1 side divides the portion having the middle pretilt angle (herein, 5°) on the counter substrate 11 side. Then, liquid crystal with right-handed twist property is injected into a gap between the substrates 1 and 11. As a result, as shown in FIG. 5, four liquid crystal layer regions (A), (B), (C), and (D) are obtained.

In the liquid crystal layer region (A), the pretilt angles on the counter substrate 11 side and the base substrate 1 side are 9° and 7°, respectively. It is apparent that the pretilt angle on the counter substrate 11 side is larger. In the liquid crystal layer region (C), the pretilt angles on the counter substrate 11 side and the base substrate 1 side are 5° and 3°, respectively. It is apparent that the pretilt angle on the counter substrate 11 side is larger. Accordingly, in these regions (A) and (C), the standing of the liquid crystal molecules in the vicinity of the center of the liquid crystal layer 4 is regulated by the alignment film 13 on the counter substrate 11. On the other hand, in the liquid crystal layer regions (B) and (D), the pretilt angle on the base substrate 1 side is larger. Thus, the standing of the liquid crystal molecules in the vicinity of the center of the liquid crystal layer 4 is regulated by the alignment film 3 on the base substrate 1. Accordingly, reference orientation directions different from each other by 180° can be alternately obtained in one and the same liquid crystal panel. Each of such liquid crystal layer regions may correspond to one pixel region. Alternatively, one pixel region may be divided into a plurality of sub-regions which correspond to the liquid crystal layer regions, respectively. In such a case, a finer image can be obtained.

Figure 5:
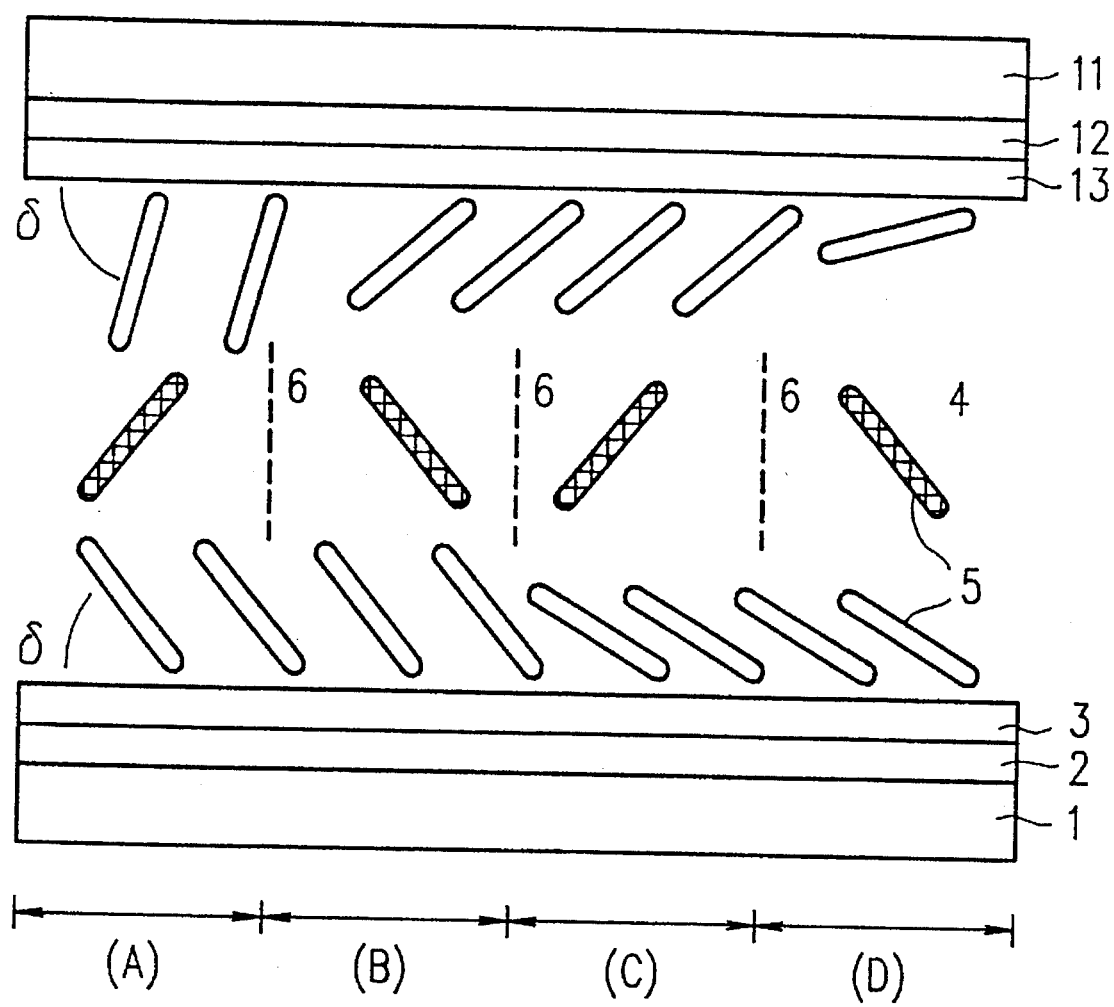

In the LCD shown in FIG. 5, the pretilt angles on the substrate sides are not limited to the above-described specific values. If the pretilt angles are selected so that they satisfy the above-defined relationship in magnitude, and the difference between adjacent pretilt angles is 3° and the difference between opposing pretilt angles is 1.5°, a good orientation control can be performed. If the pretilt angle exceeds 20°, the orientation regulation power in the entire liquid crystal cell becomes stronger than the orientation regulation power of the alignment film having the larger pretilt angle. Thus, it becomes impossible to control the alignment of liquid crystal by the alignment film having the larger pretilt angle. Therefore, it is necessary to set the maximum value of the pretilt angle to be 20° or less.

Alternatively, for example, one substrate has four aligning conditions and pretilt angles of 10°, 7°, 4°, and 1°, and the other substrate has three aligning conditions and pretilt angles of 8.5°, 5.5°, and 2.5°. Alternatively, for example, one substrate has seven aligning conditions and pretilt angles of 19°, 16°, 13°, 10°, 7°, 4°, and 1°, and the other substrate has six aligning conditions and pretilt angles of 17.5°, 14.5°, 1.5°, 8.5°, 5.5°, and 2.5°. In this way, by dividing the aligning condition into a larger number of aligning conditions, a finer image can be obtained.

In the above-described example, the irradiation of ultraviolet rays is used for changing the aligning condition. It is assumed that the pretilt angle is changed by the irradiation of ultraviolet rays for the following possible reasons.

If the polyimide film is supplied with a high energy by the irradiation of ultraviolet rays, the chemical structure of the surface of the polyimide film is changed. More specifically, when the polyimide film is irradiated with ultraviolet rays, $O_3$ (ozone) is generated. The $O_3$ oxidizes alkyl radicals of polyimide, so as to produce carbonyl radicals. Due to the carbonyl radicals, the polarity of the surface of the polyimide film is changed, and the pretilt angle of liquid crystal molecules which are polar molecules is also changed.

The surface tension of the polyimide film is changed by the irradiation of ultraviolet rays, so that the pretilt angle is changed.

In another mechanism, when the polyimide film is irradiated with ultraviolet rays, the degree of roughness of the alignment film surface is changed. Such variation of degree of roughness of the alignment film surface is experimentally confirmed. It is also experimentally confirmed that the pretilt angle is changed due to such variation.

EXAMPLE 5

In this example, the aligning conditions on each substrates are changed by a method other than the irradiation of ultraviolet rays. In this example, the alignment film surface in which a plurality of portions having different aligning conditions are to be formed is in contact with 0.5% NaOH aqueous solution. By utilizing the non-uniform solubility of the solution to the alignment film, a desired degree of roughness is formed on the alignment film surface. Instead of the alkaline solution such as an NaOH aqueous solution, it is possible to use an acidic solution containing a hydrofluoric acid, a nitric acid or both of them as the main component. Alternatively, instead of such solutions, if ozone or ammonia gas, which is a reaction gas, is in contact with the alignment film surface, a desired degree of roughness is formed on the alignment film surface. Alternatively, if the surface of the alignment film is subjected to a plasma treatment using a gas which is selected from a group of oxygen ($O_2$), argon (Ar), krypton (Kr), and the like, it is possible to form the roughness on the alignment film surface.

As the result of the above-described process, various patterns of different aligning conditions may be obtained. For example, on each of the surfaces of the alignment films on the base substrate side and the counter substrate side, two types of portions having different degrees of roughness are alternately formed by the above-described method. The substrates are combined so as to align the boundaries between the two types of portions in such a manner that the portion which is highly roughed on one substrate faces the portion which is not so roughed on the other substrate. As a result, a liquid crystal layer region in which the pretilt angle on the counter substrate side is larger than that on the base substrate and a liquid crystal layer region in which the pretilt angle on the counter substrate side is smaller than that on the base substrate are alternately formed. Therefore, two types of regions having reference orientation directions which are different from each other by 180° can be alternately formed in one and the same liquid crystal panel.

Alternatively, for example, the surface of one alignment film is partially roughed, so as to form two types of portions having different aligning conditions. On one substrate, an alignment film having an intermediate degree of roughness between the two degrees of roughness on the facing alignment film is formed. As a result, a liquid crystal layer region in which the pretilt angle on one substrate is larger than that on the other substrate and a liquid crystal layer region in which the pretilt angle on one substrate is smaller than that on the other substrate are formed in one and the same liquid crystal panel. The latter method has an advantage in that it is unnecessary to align the boundaries between the portions having different aligning conditions when the substrates are combined. At this time, each liquid crystal layer region may correspond to one pixel region. Alternatively, a plurality of such liquid crystal layer regions may be provided in one pixel region.

EXAMPLE 6

Figure 6:
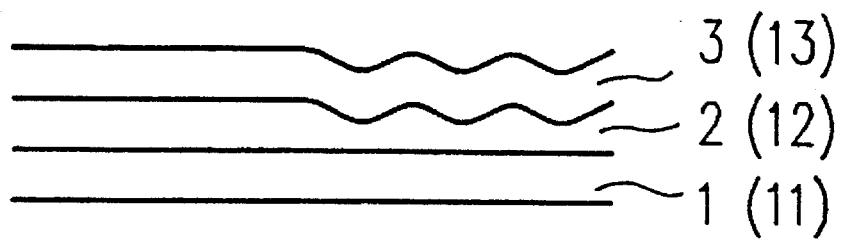
FIG. 6 is a cross-sectional view showing a sixth example of an LCD of the invention.

In Example 6, another method for forming roughness on the surface of the alignment film will be described. FIG. 6 simply shows a substrate 1 (11) in this example. Over the entire surface of the transparent substrate 1 (11), a transparent conductive film 2 (12) is formed. Over the entire surface of the transparent conductive film 2 (12), an alignment film 3 (13) is formed. Example 6 is different from Example 5 in the following point. In Example 5, the surface of the alignment film 3 (13) is roughed in a direct way. In Example 6, the roughness is formed on the transparent conductive film 2 (12), and the alignment film 3 (13) is formed by printing thereon. Thus, the surface of the alignment film 3 (13) is made rough.

The formation of the roughness on the surface of the transparent conductive film 2 (12) is performed by first forming the transparent conductive film 2 (12) on the transparent substrate 1 (11), and then etching the surface of the transparent conductive film 2 (12) with an acidic solution or an alkaline solution. Alternatively, by performing a plasma treatment for the surface of the transparent conductive film 2 (12) with a gas which is selected from a group of $O_2$, Ar, Kr, and the like, the surface of the transparent conductive film 2 (12) can be made rough. Alternatively, the roughness may be formed by contacting a reaction gas. On the transparent conductive film 2 (12) of which the surface is roughed, the alignment film 3 (13) is formed by printing. Accordingly, the surface of the alignment film 3 (13) has the same degree of roughness as that of the surface of the transparent conductive film 2 (12).

If a resist is used when the roughness is directly formed on the surface of the alignment film or when the condition of the alignment film surface is changed as in the above-described examples, there exist problems in that the surface of the alignment film is contaminated by the resist, and the orientation regulating power of the alignment film is degraded. However, in this example, the roughness is first formed on the surface of the transparent conductive film 2 (12), and the roughness is transferred to the surface of the alignment film 3 (13). Therefore, in this example, such problems of the contamination of the alignment film surface by the resist and the degradation of orientation regulating power by the alignment film cannot occur.

In the method of Example 6 in which the roughness is formed on the film 2 (12) which is disposed under the alignment film 3 (13) and the roughness is transferred to the surface of the alignment film 3 (13) so as to control the aligning characteristics, the underlying film may be made of any material as far as the degree of roughness of the surface of the underlying film can be locally changed. Alternatively, a layer disposed under the transparent conductive film 2 (12) may be subjected to the surface treatment, and the roughness of the alignment film 3 (13) may be eventually controlled by the underlying layer.

The degree how the roughness of the surface of the transparent conductive film 2 (12) is transferred to the surface of the alignment film 3 (13) can be controlled by the film thickness of the alignment film 3 (13). That is, if the alignment film 3 (13) is thin, the roughness of the transparent conductive film 2 (12) is substantially kept in the surface of the alignment film 3 (13). Thus, the surface of the alignment film 3 (13) may have substantially the same degree of roughness as that of the transparent conductive film 2 (12). In the case where the alignment film 3 (13) is thick, even when the transparent conductive film 2 (12) has a higher degree of roughness, the degree of roughness formed in the surface of the alignment film 3 (13) is lower than that in the transparent conductive film 2 (12). Therefore, by appropriately selecting the thickness of the alignment film 3 (13), a desired degree of roughness can be obtained. The thickness of the alignment film 3 (13) can be reduced, for example, by the irradiation of ultraviolet rays or by performing the development using photolithography for a longer time period than usual.

The portions having different degrees of roughness formed in the surface of the transparent conductive film 2 (12) may be formed in such a pattern that each portion corresponds to one pixel portion. Alternatively, in one pixel region, a plurality of portions having different degrees of roughness may be formed. The variation pattern of degrees of roughness in the surface of the transparent conductive film 2 (12) may be determined correspondingly to the pattern to be formed on the surface of the alignment film 3 (13).

The thus obtained substrates 1 and 11 are attached to each other as described in the above examples, and liquid crystal is injected into a gap between the substrates 1 and 11. As a result, in one liquid crystal cell, a liquid crystal layer region in which the pretilt angle on the counter substrate 11 side is larger than that on the base substrate i side, a liquid crystal layer region in which the pretilt angle on the counter substrate 11 side is smaller than that on the base substrate 1 side, and a liquid crystal layer region in which the pretilt angles on the substrates 1 and 11 sides are equal to each other can be formed in a desired pattern so as to have desired areas, respectively. Therefore, according to this example, in one and the same liquid crystal cell, a plurality of reference orientation directions including reference orientation directions which are different from each other by 180° can be formed. As a result, superior viewing performance can be obtained.

EXAMPLE 7

Figure 7:
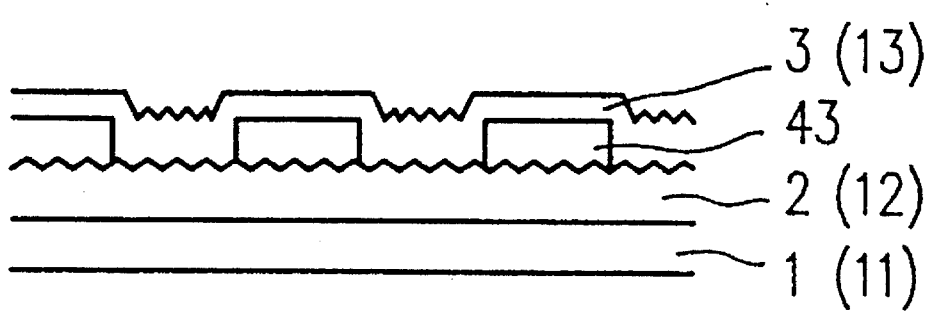
FIG. 7 is a cross-sectional view showing a seventh example of an LCD of the invention.

In this example, similar to Example 6, the roughness is provided not on the surface of the alignment film 3 (13) but on the surface of the transparent conductive film 2 (12), and thus substantially the same degree of roughness as in the transparent conductive film 2 (12) is provided on the surface of the alignment film 3 (13). This example is different from Example 6 in the following point. In this example, after the roughness is formed on the surface of the transparent conductive film 2 (12), an insulating film 43 is partially formed on the transparent conductive film 2 (12). FIG. 7 simply shows a substrate of this example. As shown in FIG. 7, a transparent conductive film 2 (12) is formed over the entire surface of a transparent substrate 1 (11). On the transparent conductive film 2 (12), an insulating film 43 is partially formed. Then, an alignment film 3 (13) is formed thereon over the entire face of the substrate. As for the material of the insulating film 43, silicon nitride, silicon oxide, or the like is used. In a portion of the surface of the alignment film 3 (13) corresponding to the edge of the insulating film 43, not only the surface condition of the insulating film 43, but also the difference in level between the surface of the insulating film 43 and the transparent conductive film 2 (12) appear as large roughness. To the surface of the portion of the alignment film 3 (13) positioned above the surface of the insulating film 43, the degree of roughness formed on the surface of the transparent conductive film 2 (12) is not transferred. Thus, the surface of the portion of the alignment film 3 (13) positioned above the surface of the insulating film 43 has a condition depending on the surface condition of the insulating film 43.

In the above-described manner, in this example as well as in the above-described examples, the surface of the alignment film 3 on the base substrate 1 or the alignment film 13 on the counter substrate 11 can be set to have desired aligning conditions. Then, the base substrate 1 and the counter substrate 11 which are processed as described above are attached to each other, and liquid crystal is injected into a gap between the substrates 1 and 11. As a result, a liquid crystal layer region in which the pretilt angle on the counter substrate 11 side is larger, a liquid crystal layer region in which the pretilt angle on the base substrate 1 side is larger, and a liquid crystal layer region in which the pretilt angles on both substrate sides are equal to each other are formed in a desired pattern so as to have desired areas, respectively. Therefore, in one and the same liquid crystal cell, a plurality of liquid crystal layer regions having different reference orientation directions including the reference orientation directions which are different from each other by 180° can be formed. As a result, the viewing characteristics when viewed from a plurality of reference orientation directions are mixed and made uniform, so that good viewing performance can be obtained.

In this example, other processes such as the light irradiation for the formation of roughness or the formation of resists are not performed before the insulating film 43 is formed. In addition, the insulating treatment and the aligning control are performed in one process, so that the production process is very simplified. Thus, it is possible to provide an LCD having superior viewing performance at a low cost.

EXAMPLE 8

Examples 8 to 10 describe exemplary cases for preventing the deterioration in contrast due to a disclination line caused at the boundary between liquid crystal layer regions having reference orientation directions different from each other which are formed in one pixel region.

Figure 8:
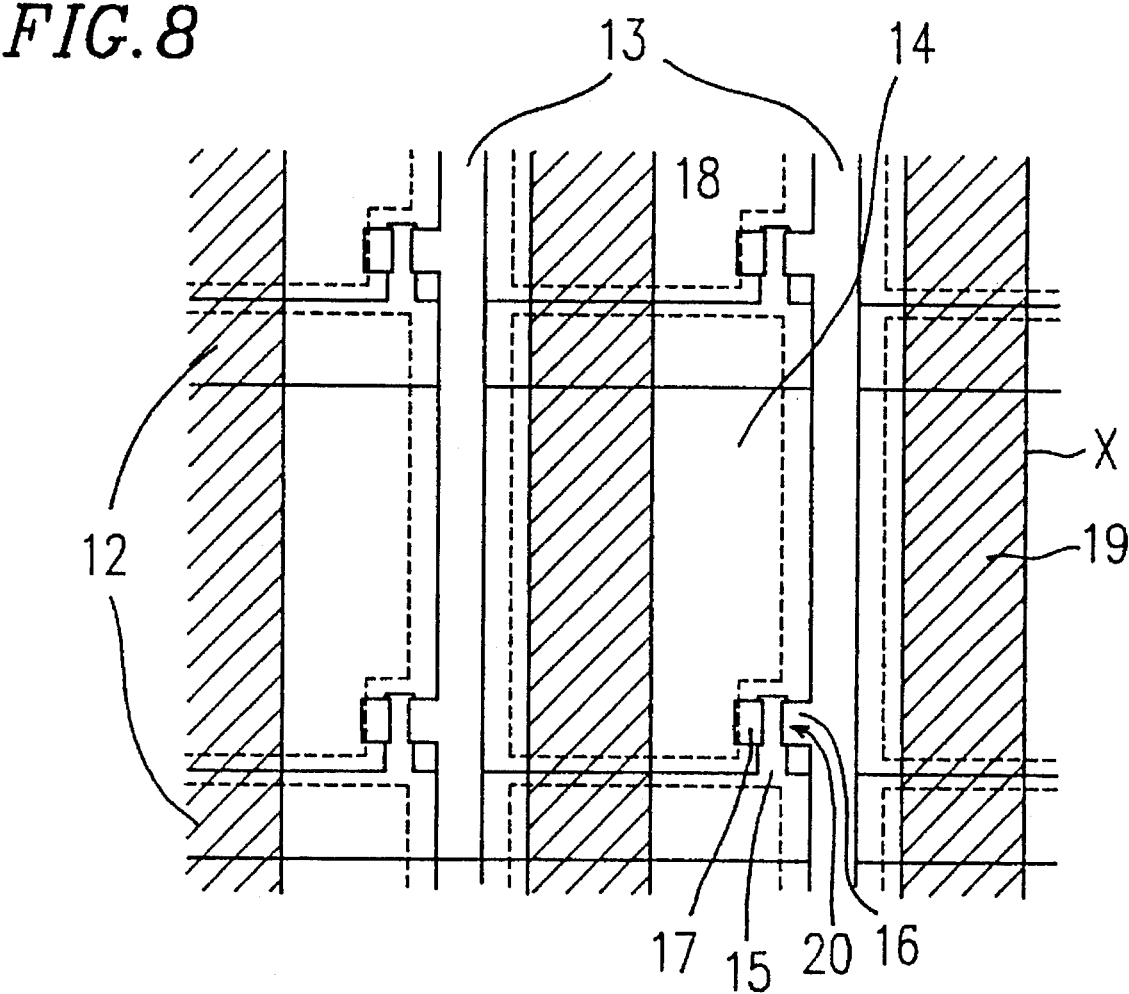
FIG. 8 is a plan view showing an eighth example of an LCD of the invention.

FIG. 8 is a plan view showing one example in which the present invention is applied to the TN mode active matrix type LCD. FIG. 9 is a cross-sectional view thereof. In the LCD, as is shown in FIG. 9, an active matrix substrate 31 is disposed so as to face a counter substrate 32, and a liquid crystal layer 33 is sealed therebetween. The active matrix substrate 31 includes an insulating substrate 31a made of glass. A plurality of scanning lines 12 and a plurality of signal lines 13 are formed so as to cross each other on the insulating substrate 31a. In each of the areas defined by the scanning lines 12 and the signal lines 13, a pixel electrode 14 is disposed. In the vicinity of each of the crossings of the scanning lines 12 and the signal lines 13, a thin film transistor 20 (hereinafter referred to as a TFT) as a nonlinear element having a switching function is formed. The TFT 20 is electrically connected to one of the scanning lines 12, one of the signal lines 13, and the corresponding pixel electrode 14. The TFT 20 includes a gate electrode 15 which is branched from the scanning line 12, a source electrode 16 which is branched from the signal line 13 toward the pixel electrode 14, and a drain electrode 17 of which the end overlaps the pixel electrode 14. As the TFT 20, an amorphous silicon TFT is employed in this example. The TFT 20 can be formed on the scanning line 12.

On the pixel electrode 14, there is superposed a scanning line 12 which is adjacent to the scanning line 12 connected to the TFT 20 connected to the pixel electrode 14. The superposed portion 18 functions as an additional capacitance. In an alternative case, an additional capacitance line (not shown) is formed separately from the scanning line 12. In such a case, the additional capacitance 18 can be formed on the additional capacitance line.

Above these electrode lines, that is, above the scanning lines 12 and the signal lines 13, and above the TFTs 20, an insulating protective film 31d is formed in order to prevent short-circuits between the substrate 31a and these electrode lines and the TFTs and between the TFTs and the electrode lines. The insulating protective film 31d can be formed so as to have openings corresponding to respective pixel electrodes 14.

In the counter substrate 32 which faces the active matrix substrate 31 having the above-described structure, a color filter 32b, a counter electrode 32c, and an alignment film 32e are formed in this order on an insulating substrate 32a made of glass.

When the following process steps are performed for the LCD of this example having the above construction, the LCD which can actually be driven to display can be produced. Specifically, the LCD which can actually be driven to display is produced by a step for forming alignment films 31e and 32e on the active matrix substrate 31 and the counter substrate 32, respectively, a step for performing a rubbing treatment for the alignment film 31e, a step for attaching the active matrix substrate 31 to the counter substrate 32, a step for providing a liquid crystal layer 33 by injecting liquid crystals between the substrates 31 and 32, and other steps, and then a step for mounting peripheral circuits such as a drive circuit.

In the production process, some process steps for providing a plurality of liquid crystal layer regions having different reference orientation directions in one pixel region are performed. In this example, in order to allow two reference orientation directions to exist in one pixel region, an aligning treatment is performed for the alignment film 31e of the active matrix substrate 31, so as to form a liquid crystal layer region 19 having a reference orientation direction which is different from the reference orientation direction in the other liquid crystal layer region over two or more pixel regions.

Such a liquid crystal layer region 19 is, for example, formed in the following manner. A portion of at least one substrate corresponding to one liquid crystal layer region is covered with a protective film, and the aligning treatment is performed in this state. Then, after the protective film is removed, a portion corresponding to the other liquid crystal layer region is covered with a protective film, and the aligning treatment is performed so as to have a different aligning condition from that of the previously treated portion. In an alternative case, a region of the surface of the pixel electrode 14 is chemically changed by using liquid such as an acidic or alkaline solution, so as to make the surface rough. Thus, the aligning directions are controlled by utilizing the difference in tilt angles or tilt directions between the rough region and the flat region. As a method for making the surface rough, the surface may be chemically changed by gas, plasma, or by electromagnetic waves including light, or the surface may be physically changed by solid, gas, plasma, or electromagnetic waves including light.

In the case where the insulating film is formed above the electrode lines and the TFTs, in order to prevent short-circuits between the substrates and between the electrode lines, the insulating film sur- face is treated so as to chemically change the surface condition by using liquid such as an acidic or alkaline solution, gas, plasma, or electromagnetic waves including light, or the like, or so as to physically change the surface condition by using solid, gas, plasma, electromagnetic waves including light, or the like. Simultaneously, the insulating film is patterned. As a result, the in-plane orientation directions in the liquid crystal panel of the liquid crystal molecules in the vicinity of the center of the liquid crystal layer along the thickness direction thereof, i.e., the reference orientation directions can be controlled by controlling the tilt angles or the tilt directions.

Accordingly, in this example, in order to allow two reference orientation directions to exist in one pixel region, a liquid crystal layer region having a reference orientation direction different from that of the other region is formed over two or more pixel regions. Accordingly, the boundary X of the liquid crystal layer regions with different reference orientation directions is positioned over two or more pixel regions. As a result, the free energy included in the boundary is reduced, so that the possibility of one aligning condition being absorbed by the other aligning condition can be avoided. In this way, the anisotropy of refractive indices of liquid crystal molecules is not lost, and it is possible to ensure the optical rotatory power of light. As a result, the viewing angle dependence of the contrast can be eliminated.

In this example, the aligning treatment for forming two liquid crystal layer regions having different reference orientation directions is performed only for the alignment film 31e of the active matrix substrate 31. For the alignment film 32e of the counter substrate 32, an aligning treatment for applying a uniform aligning condition over the entire surface thereof is performed. Alternatively, the aligning treatment for forming two types of liquid crystal layer regions having different reference orientation directions may be performed only for the alignment film 32e of the counter substrate 32, or for both the alignment films 31e and 32e of the substrates 31 and 32. In such cases, it is possible to eliminate the viewing angle dependence, similar to the above-described case.

Figure 10:
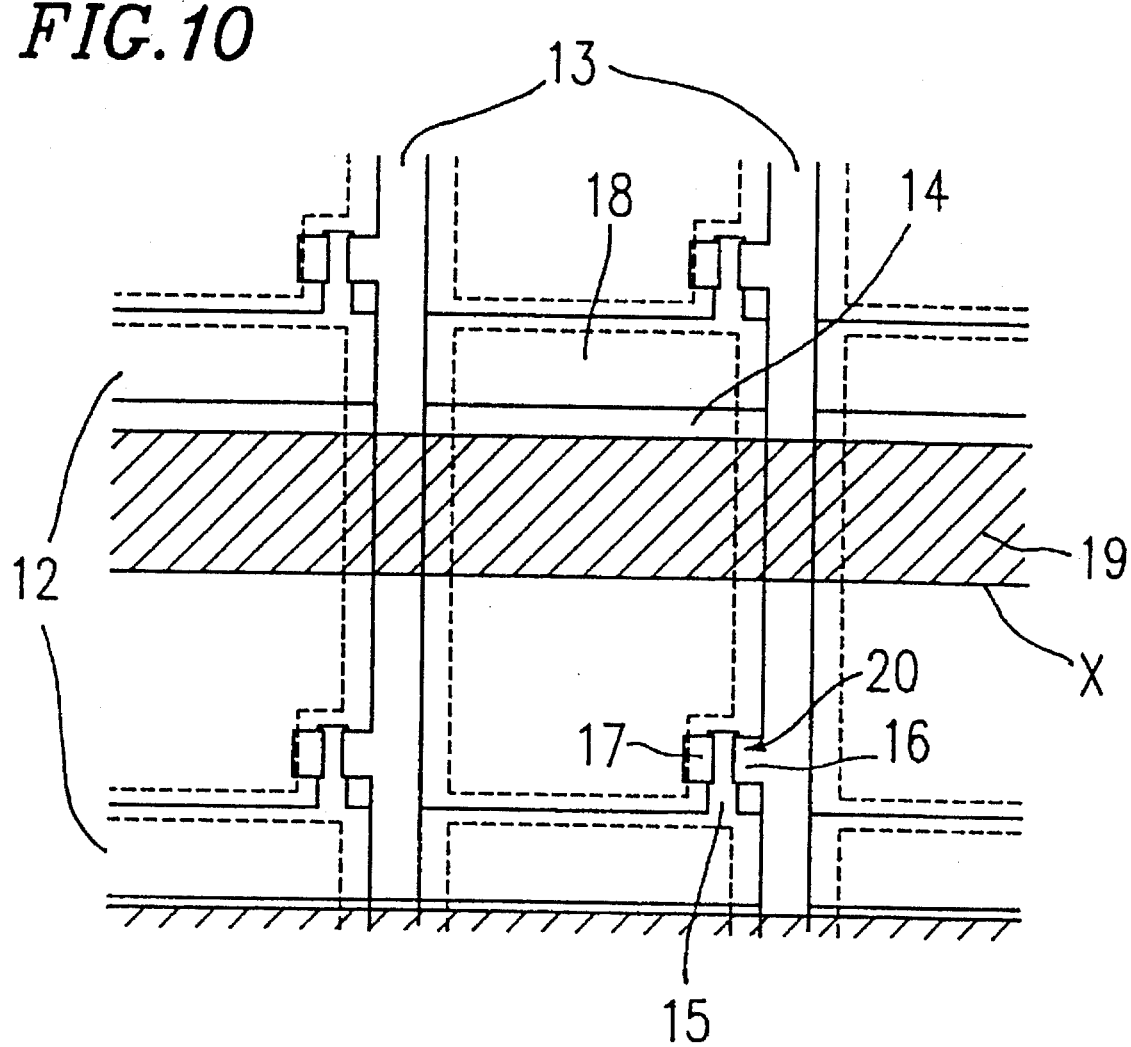
FIG. 10 is a plan view showing a modification of the eighth example of an LCD of the invention.

In this example, the boundary X between the liquid crystal layer regions with different reference orientation directions is set so as to be parallel to the signal lines 13. However, this invention is not limited to this specific setting. Alternatively, two types of liquid crystal layer regions may be formed so that the boundary X therebetween is parallel to the scanning lines 12, as is shown in FIG. 10. In such a case, it is possible to eliminate the viewing angle dependence for the above-described reasons of the above examples.

In this example, in order to allow two reference orientation directions to exist in one pixel region, two liquid crystal layer regions having different reference orientation directions are formed over two or more pixel regions. Again, this invention is not limited to this specific case. Alternatively, in order to allow two, or three or more reference orientation directions to exist in one pixel region, two, or three or more liquid crystal layer regions having different reference orientation directions may be formed over two or more pixel regions.

In addition, it is sufficient for the boundary between the liquid crystal layer regions with different reference orientation directions to exist over two or more pixel regions. Accordingly, it is unnecessary that the boundary continues over all the pixel regions in one column of picture elements among picture elements disposed in a matrix. In some cases, the boundary may be divided in one column.

EXAMPLE 9

Another example of the invention will be described.

Figure 11:
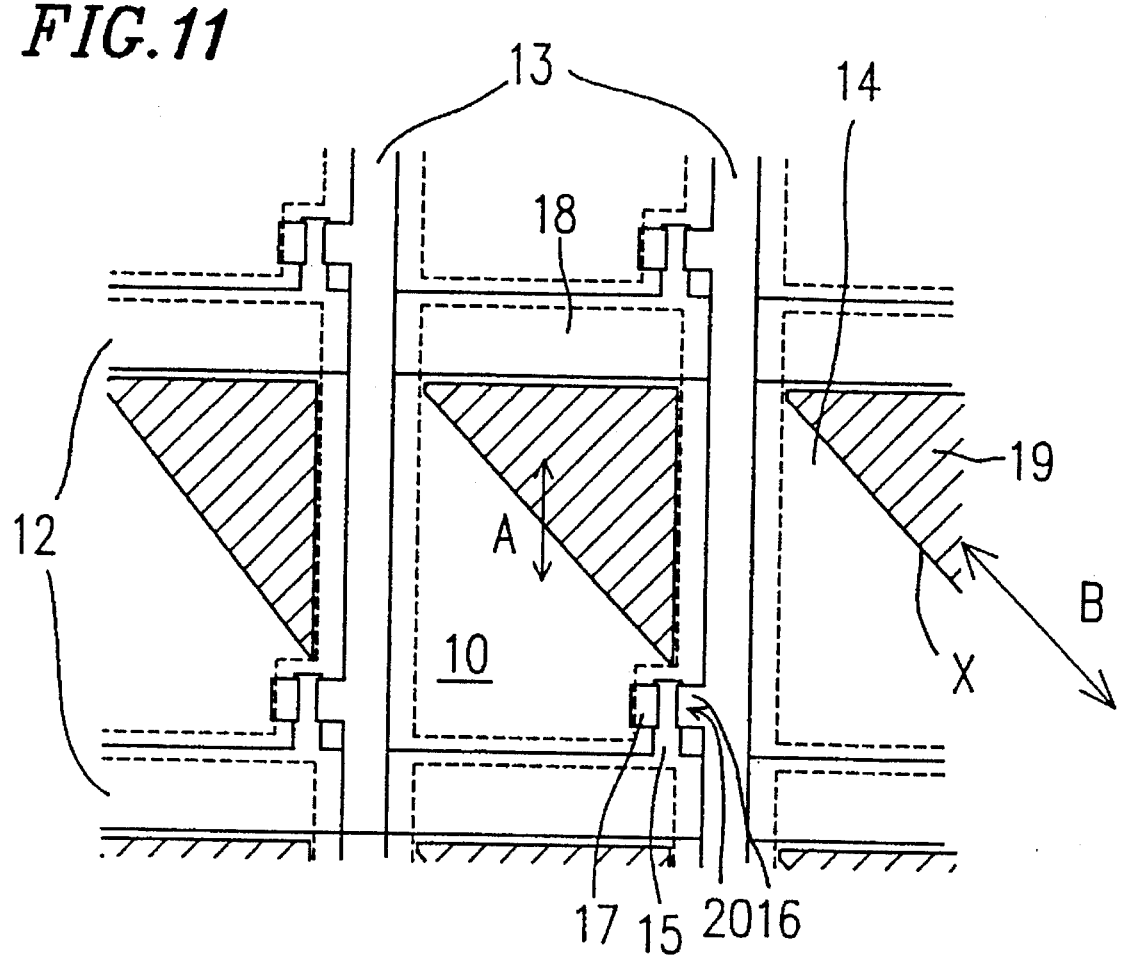
FIG. 11 is a plan view showing a ninth example of an LCD of the invention.
Figure 12:
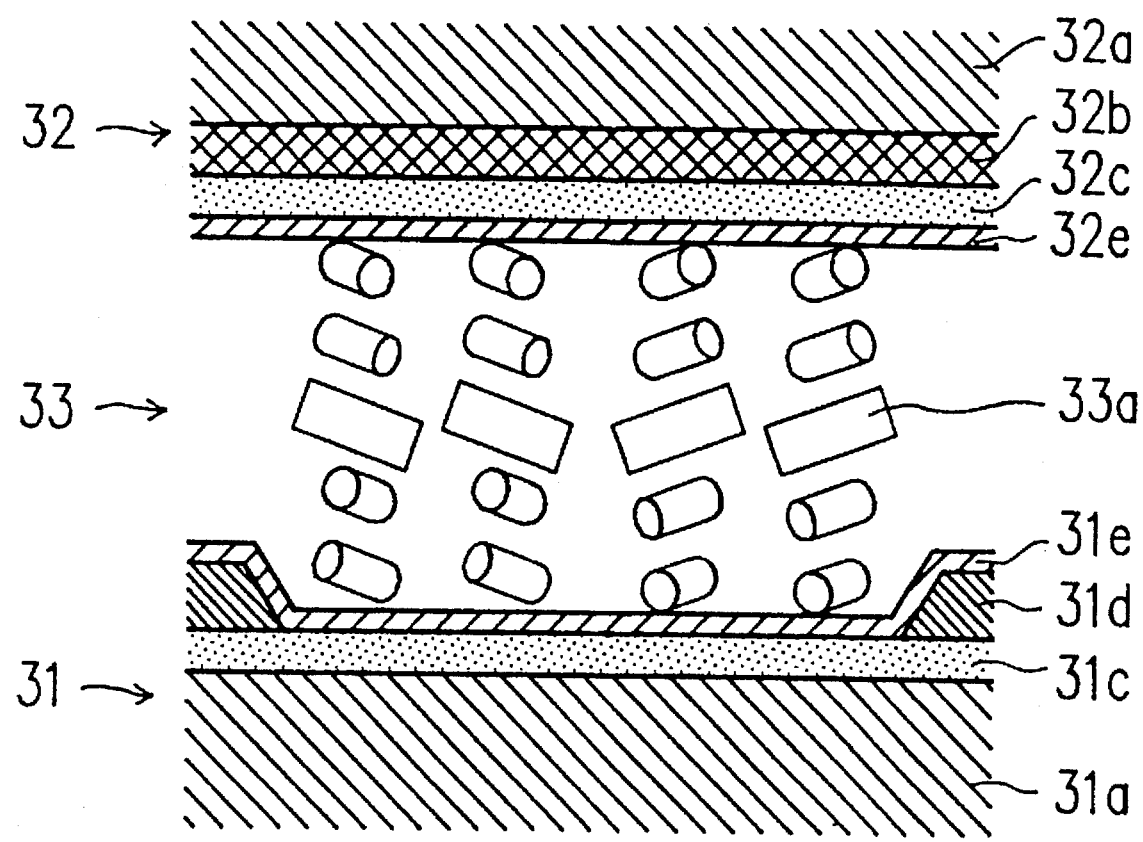
FIG. 12 is a cross-sectional view of the LCD shown in FIG. 11.

FIG. 11 is a plan view showing an LCD of Example 9 of this invention. FIG. 12 is a cross-sectional view along the arrow A in FIG. 11. Like components are indicated by like reference numerals to those in FIGS. 8 and 9. In this LCD, unlike Example 8, two liquid crystal layer regions having different reference orientation directions are formed in each pixel region. In FIG. 11, one of the two liquid crystal layer regions having different reference orientation directions is indicated by a hatched region, and the other region is indicated by a region without hatching. In this example, on the alignment film 31e on the active matrix substrate 31 side, two types of portions having different aligning conditions are formed in the above-described manner. As a result, two types of liquid crystal layer regions having different reference orientation directions are formed as shown in FIG. 11. At this time, one of the portions having different aligning conditions of the alignment film 31e is rubbed so that the orientation direction of liquid crystal molecules which are in contact with the portion coincides with the direction B. These two types of liquid crystal layer regions are positioned so that the boundary X therebetween is parallel to the orientation direction (the direction B) of the liquid crystal molecules which are in contact with the alignment film 31e on the active matrix substrate 31 side. As the aligning treatment for forming liquid crystal layer regions having different reference orientation directions, the same treatment as that performed in the above-described example can be performed.

As described above, in this LCD, the boundary X between the two liquid crystal layer regions with different orientation directions is parallel to the orientation direction (the direction B) of the liquid crystal molecules which are in contact with the alignment film 31e of the active matrix substrate 31. Accordingly, the disorder of liquid crystal alignment can be suppressed, which results in the prevention of the above-mentioned occurrence of the disclination line. In this example, liquid crystal layer regions having different reference orientation directions disposed as shown in FIG. 11 are formed by performing the aligning treatment for forming two types of portions having different aligning conditions for the alignment film 31e on the active matrix substrate 31 side. Alternatively, if such aligning treatment is performed only for the alignment film 32e of the counter substrate 32, or for both the alignment films 31e and 32e of the substrates 31 and 32, the same effect as in this example can be attained. In the former case, it is necessary to set the boundary X between the liquid crystal layer regions to be parallel to the orientation direction of liquid crystal molecules which are in contact with the alignment film 32e of the counter substrate 32. In the latter case, the boundary X may be set so as to be parallel to the orientation direction of liquid crystal molecules which are in contact with either the alignment film 31e of the active matrix substrate 31 or the alignment film 32e of the counter substrate 32.

Figure 13:
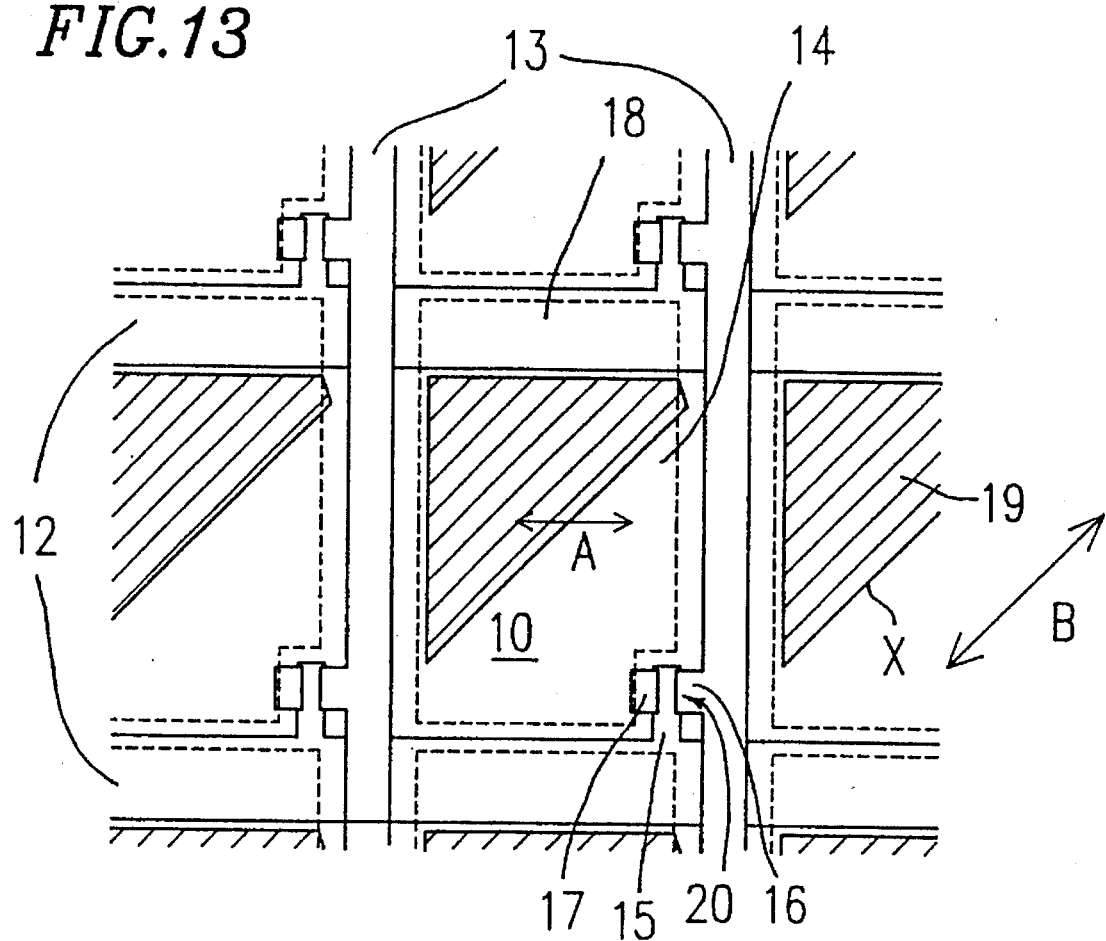
FIG. 13 is a plan view showing a modification of the ninth example of the invention.

As shown in FIG. 13, if the orientation direction (the direction B) of liquid crystal molecules is different from that in the above-described case shown in FIG. 11, it is sufficient to form two liquid crystal layer regions with different reference orientation direction so that the boundary X therebetween is set to be parallel to the orientation direction.

In the above cases, as is shown in FIGS. 11 and 13, two types of liquid crystal layer regions having different reference orientation directions are formed such that the boundary X therebetween is formed from one of the horizontally adjacent sides to the other side, or from one of the vertically adjacent sides to the other side of the display panel of the LCD. Again, the invention is not limited to these specific patterns. The boundary X extending from one side does not necessarily reach the other side. Alternatively, the boundary X may divide each of the two types of liquid crystal layer regions having different reference orientation directions.

Figure 14:
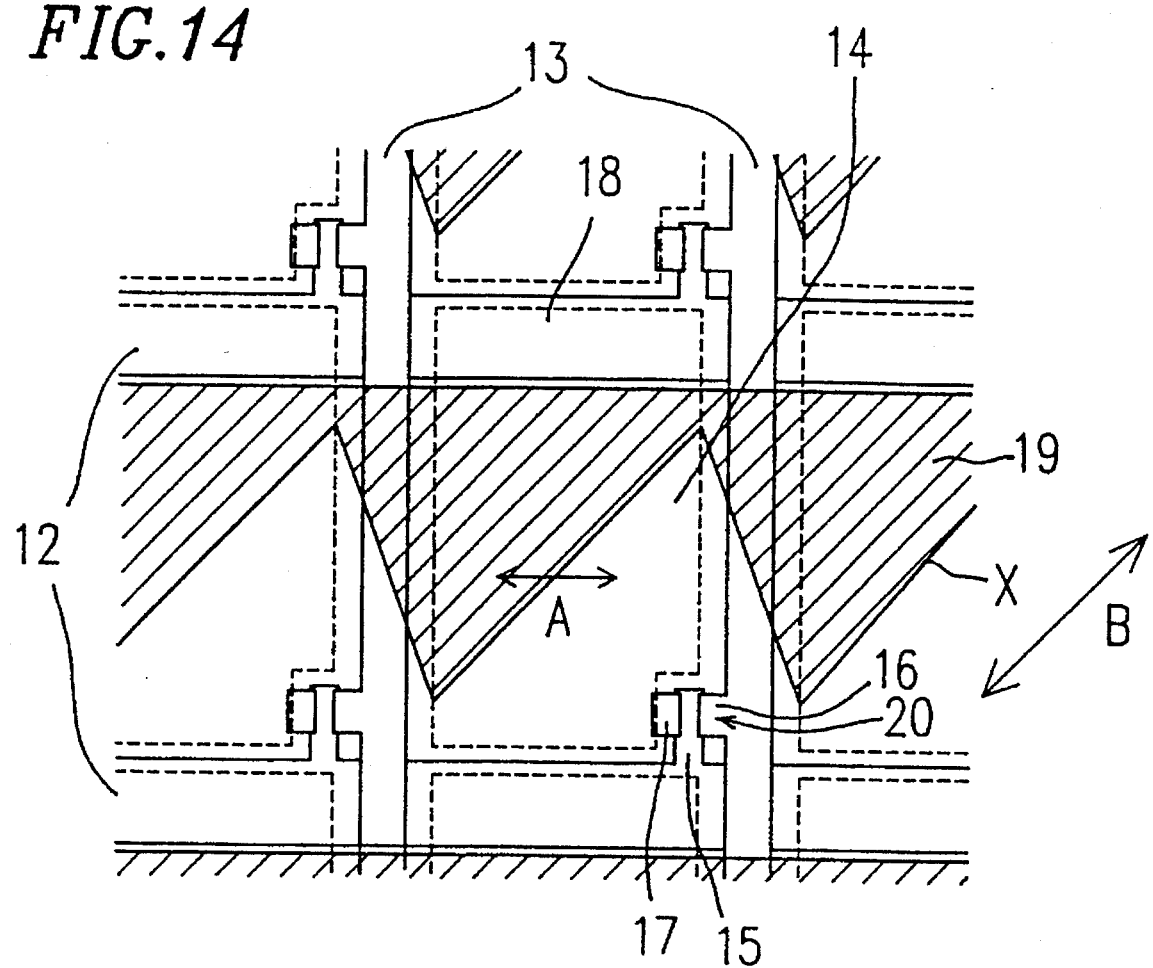
FIG. 14 is a plan view showing a modification of the ninth example of the invention.

In addition, in this example, the two types of liquid crystal layer regions with different reference orientation directions are formed in each separate pixel region. Again, this invention is not limited to this specific case. Alternatively, as is shown in FIG. 14, a liquid crystal layer region 19 having a reference orientation direction which is different from that of the other region may be formed over a plurality of successive pixel regions. In such a case, in a portion of the pixel region corresponding to the actual picture element, the boundary X between the two liquid crystal layer regions with different reference orientation directions should be set so as to be parallel to the orientation direction (the direction B) of the liquid crystal molecules. In other words, portions other than the picture element hardly affect the orientation direction of liquid crystal molecules during the display, so that the boundary X between the two liquid crystal layer regions is not necessarily parallel to the direction B. As the step of forming liquid crystal layer regions having different reference orientation directions, the process described in each of the above-described examples can be adopted.

Moreover, as shown in FIG. 13, in the case of the active matrix type LCD having the TFT 20 of a nonlinear element between the picture element and the signal line, if the boundary X between the two liquid crystal layer regions with different reference orientation directions is positioned farthest from the nonlinear element, it is possible to prevent the deterioration of the nonlinear element during the treatment for making the surface rough, which is one of the process steps for forming portions having different aligning conditions in the alignment film.

In this example, it is appreciated that three or more liquid crystal layer regions with different reference orientation directions are formed in one pixel region, and the respective boundaries are set so as to be parallel to the orientation direction of liquid crystal molecules.

EXAMPLE 10

Next, still another example of the invention will be described.

In this example, two or more liquid crystal layer regions with different reference orientation directions are formed, and a light blocking film is formed on each boundary, so that light leaked from the boundary portion is blocked by the light blocking film. In this case, it is unnecessary to set the boundary between the liquid crystal layer regions to be parallel to the in-plane orientation direction of the liquid crystal molecules which are in contact with one of the alignment films.

Figure 15:
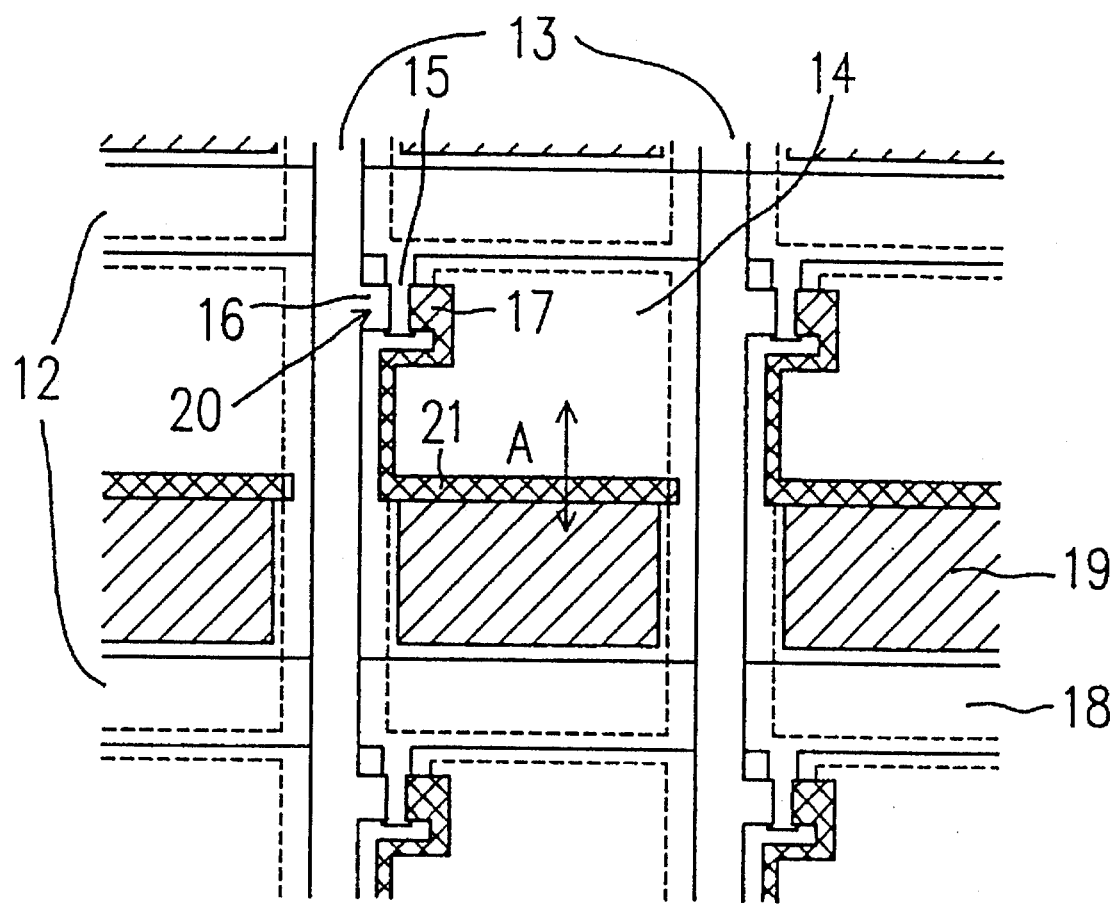
FIG. 15 is a plan view showing a tenth example of an LCD of the invention.
Figure 16:
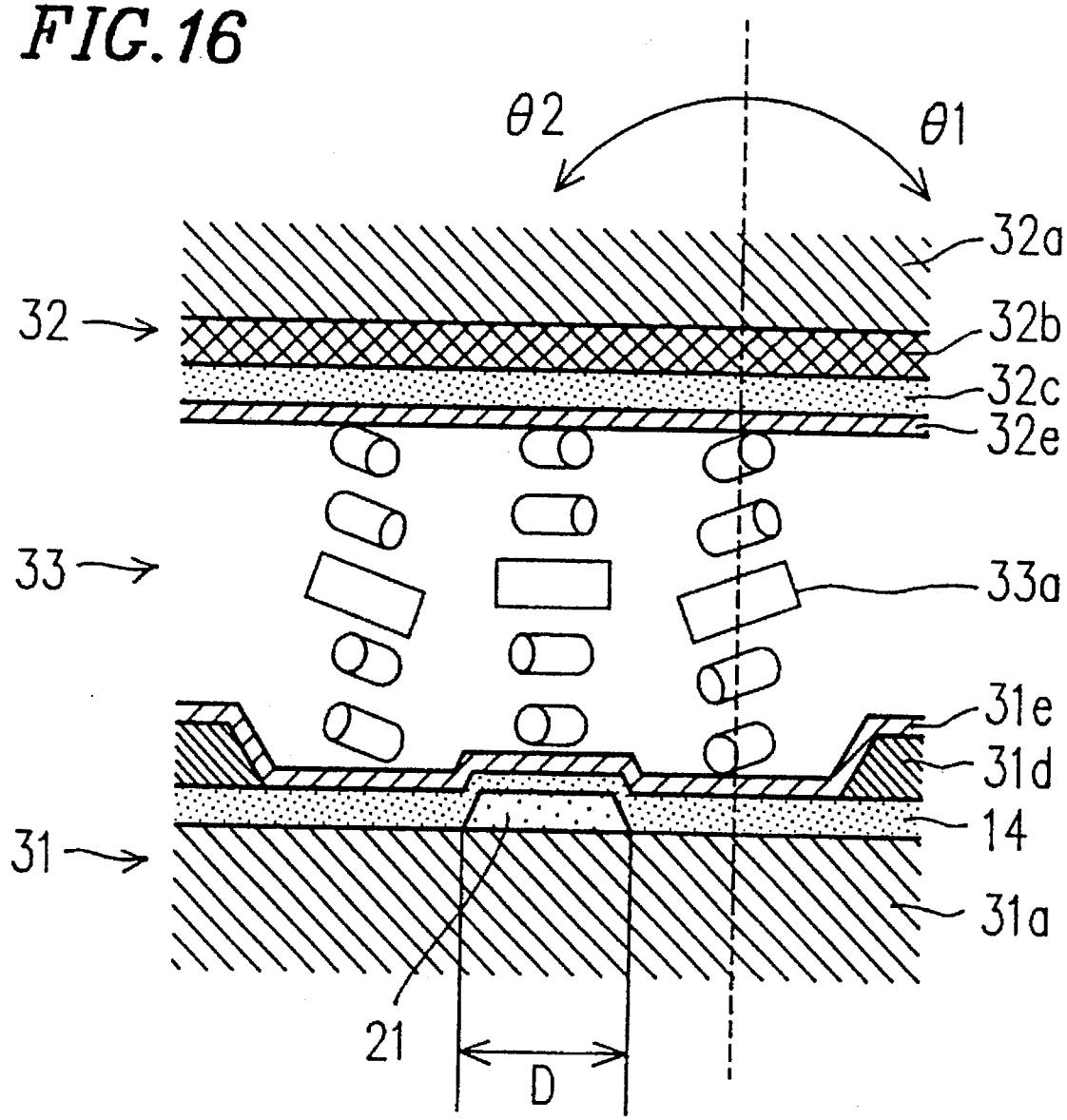
FIG. 16 is a cross-sectional view of the LCD shown in FIG. 15.

FIG. 15 is a plan view showing an LCD of this example, and FIG. 16 is a cross-sectional view thereof. In this LCD, the boundary between two liquid crystal layer regions with different reference orientation directions (one is indicated by the reference numeral 19) is covered with a light blocking film 21 which is extended from the drain electrode 17.

Accordingly, in Example 10, the light leaked from the boundary portion in which any disclination line occurs can be blocked by the light blocking film 21, so that the contrast can be enhanced. The light blocking film 21 is formed of the same material as that of the drain electrode 17 constituting the TFT 20 because the attaching accuracy of the two substrates is low. If the light blocking film 21 is separately formed, a positioning deviation occurs between the light blocking film 21 and the TFT 20, both of which have the light blocking function, after the attachment of the substrates. As a result, the opening ratio is reduced. On the contrary, if the light blocking film 21 is formed of the same material as the drain electrode 17, the deposition and etching for the drain electrode 17 can be used for the formation of the light blocking film 21. Thus, the number of process steps is not increased as compared with the conventional process.

As shown in FIG. 16, the width D of the light blocking film 21 may be set to be a value with which the light blocking film 21 can block the light leaked from the portion in which the disclination line occurs.

In this example, the light blocking film 21 is formed of the same material as that of the drain electrode 17. Alternatively, the light blocking film 21 may be formed of the same material as any electrode or the like having the light blocking function constituting the TFT 20. In such a case, the same effects can be attained.

Figure 17:
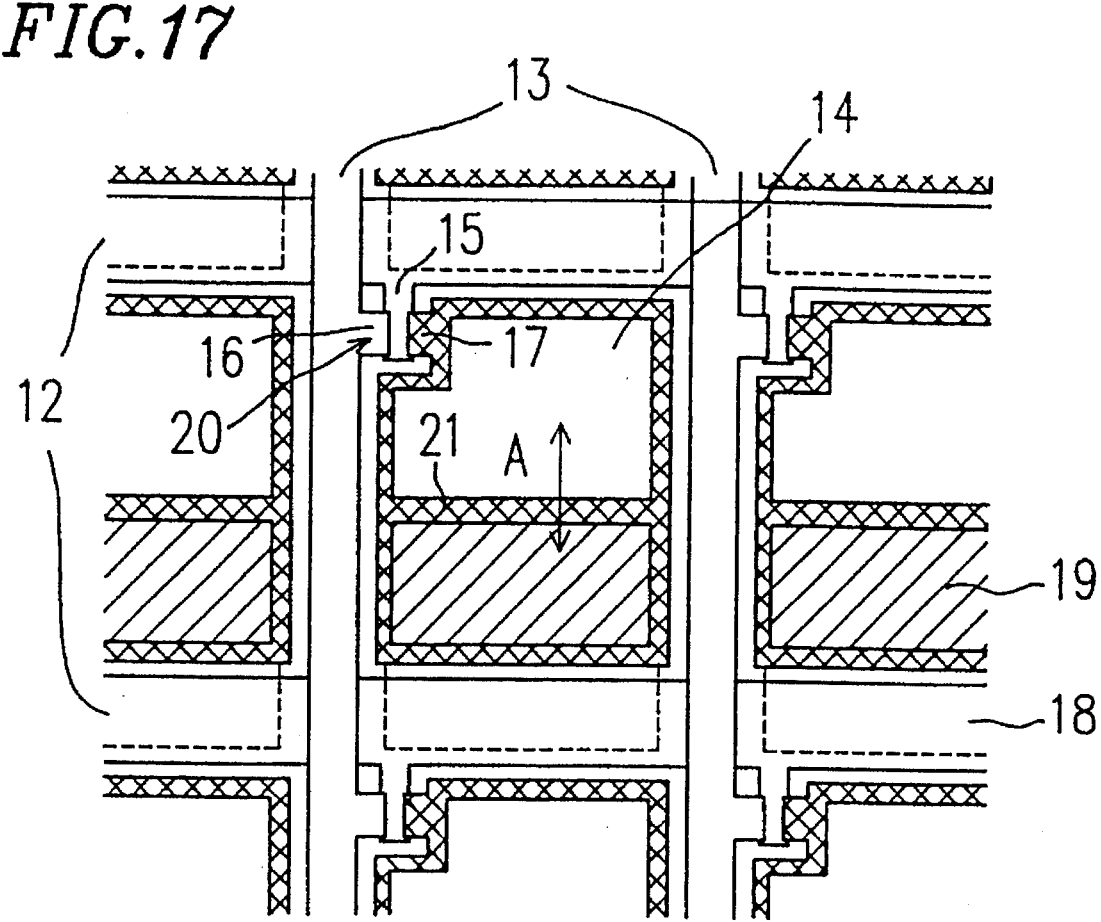
FIG. 17 is a plan view showing a modification of the tenth example of the invention.
Figure 18:
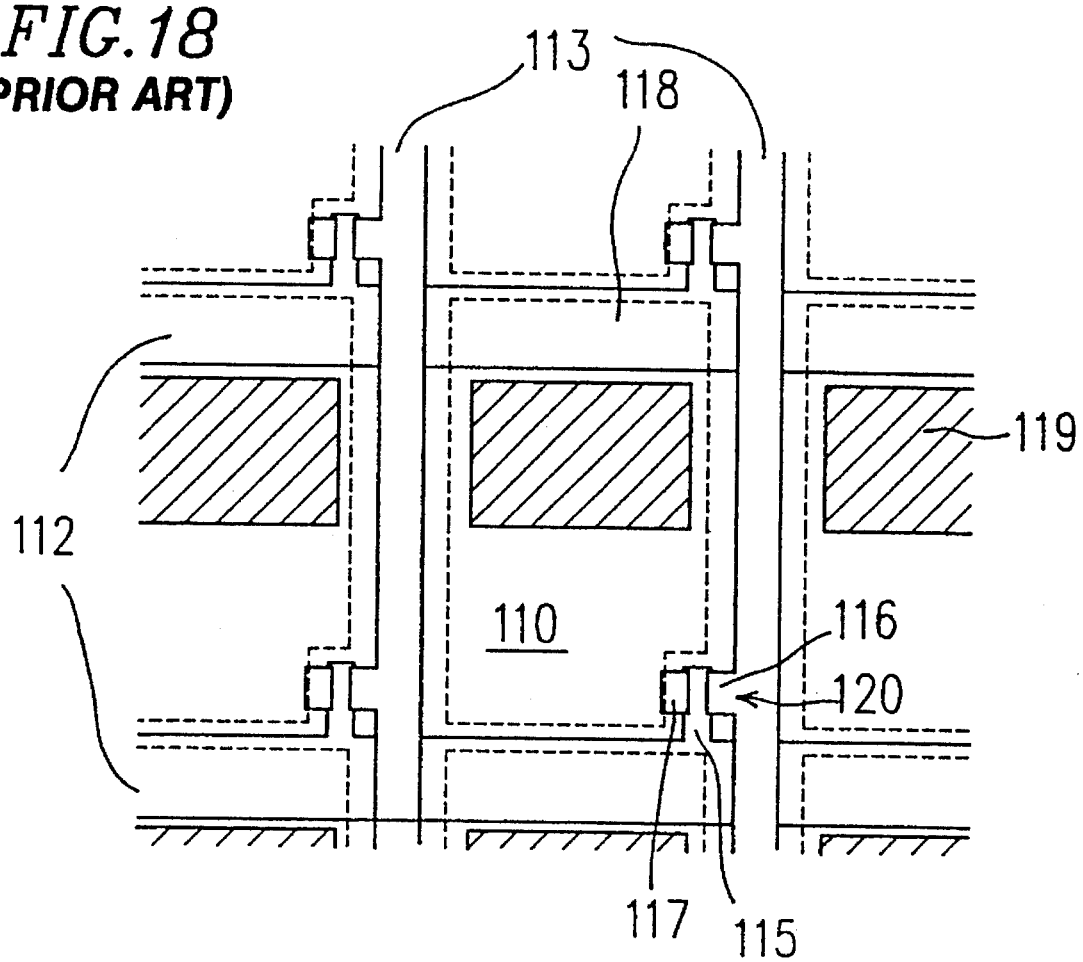
FIG. 18 is a plan view showing a conventional LCD.
Figure 19A:
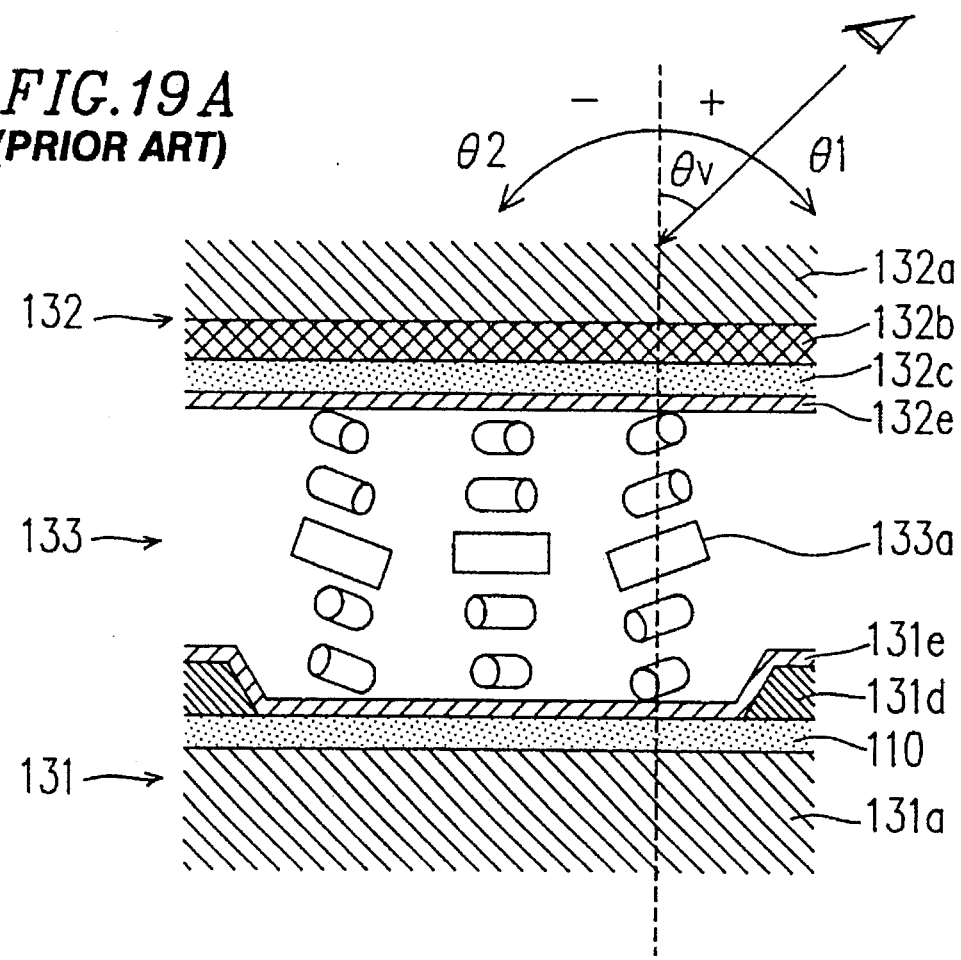
FIG. 19A is a cross-sectional view of the LCD shown in FIG. 18.
Figure 19B:
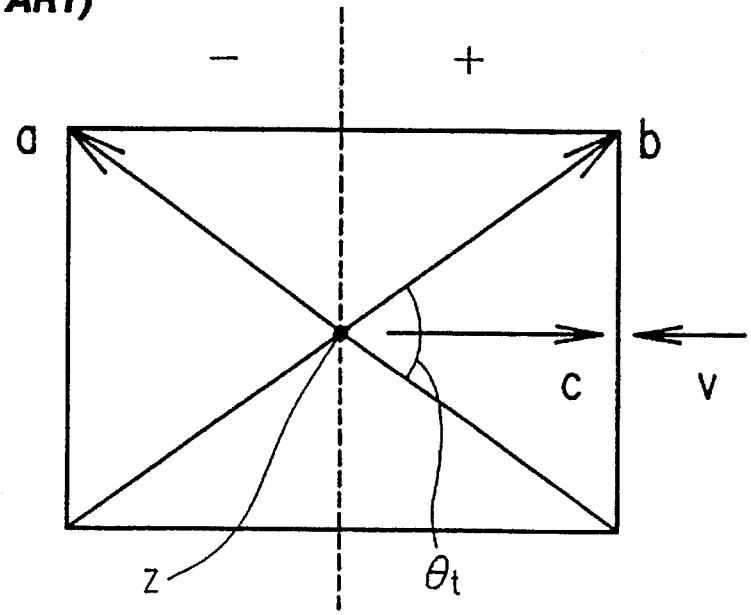
FIG. 19B shows the relationship between the orientation direction of liquid crystal and the rubbing direction.
Figure 20:
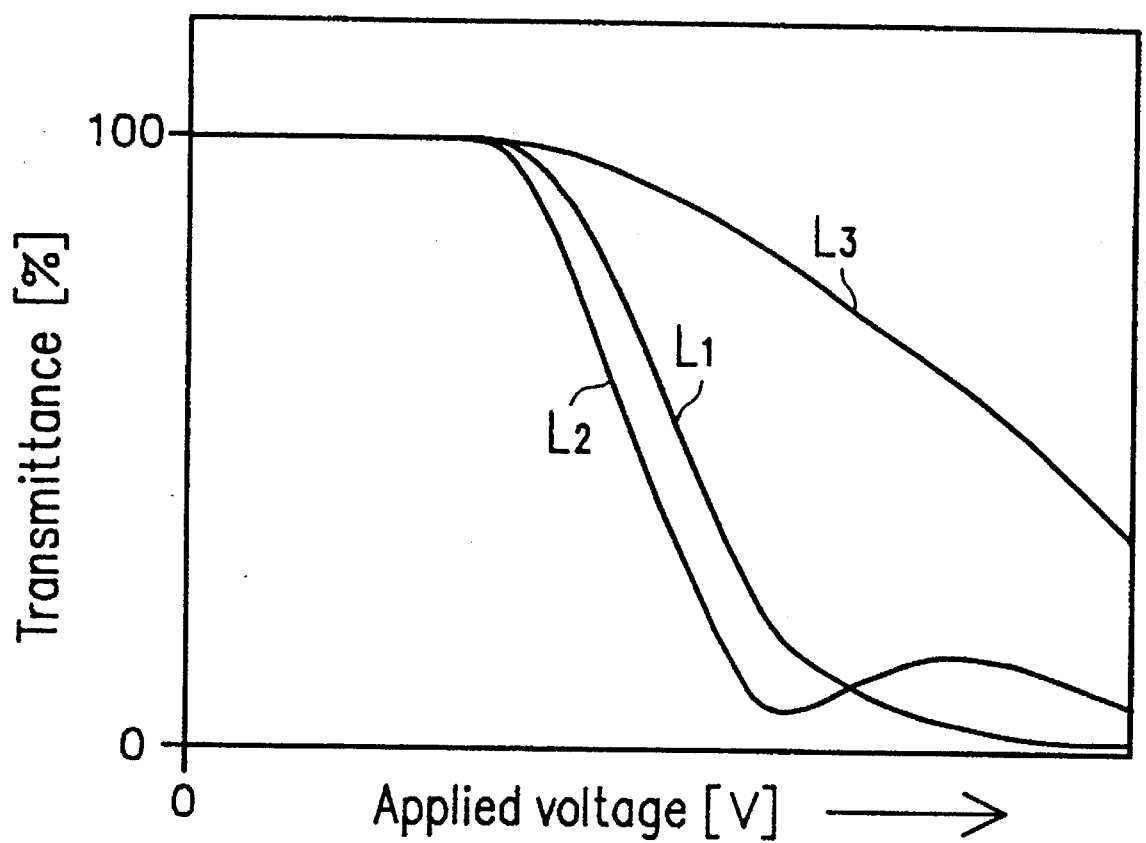
FIG. 20 shows the applied voltage to transmittance characteristics in a conventional normally white mode LCD.
Figure 21A:
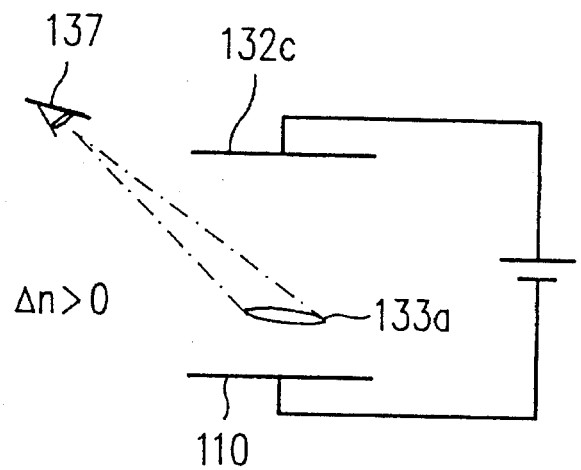
FIGS. 21A, 21B, and 21C are diagrams for illustrating the inversion phenomenon in an LCD.
Figure 21B:
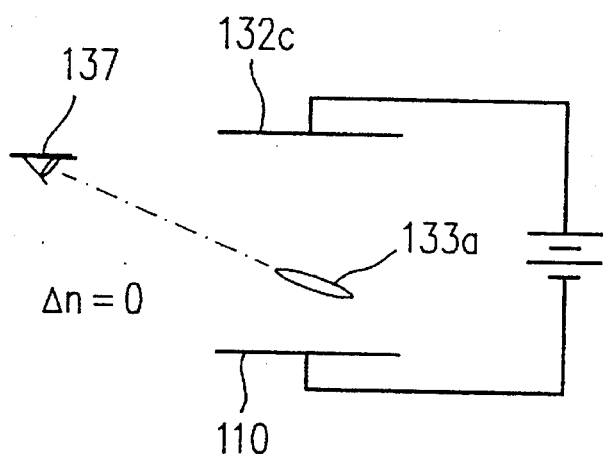
Figure 21C:
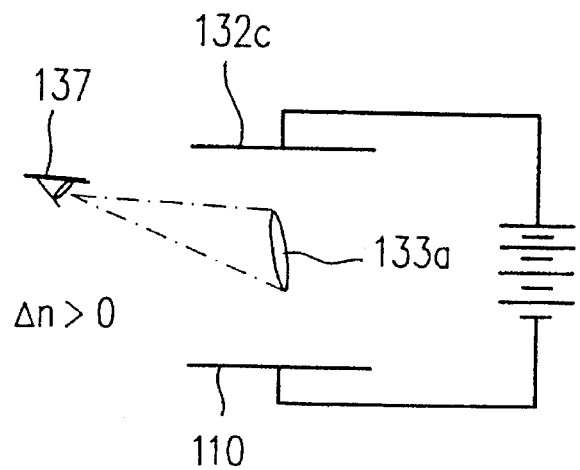

The light blocking film 21 in this example can be formed so as to cover the entire peripheral portions of the picture elements, as is shown in FIG. 17. Alternatively, the light blocking film 21 may be formed so as to cover the boundary X shown in Examples 8 and 9.

The techniques described in Examples 8, 9, and 10 can also be applied to any LCD of a desired mode and a desired structure, as well as to the LCDs of above-mentioned modes and structures.

As described above, according to the method for producing an LCD of this invention, the pretilt angles of liquid crystal molecules can be easily controlled. In addition, pretilt angles are changed for respective minute areas, so as to form different aligning conditions. The substrates which are subjected to the aligning treatments are combined, so that a liquid crystal layer region in which different aligning conditions face each other and a liquid crystal layer region in which equal aligning conditions face each other are mixedly formed. When the substrates are combined in such a manner that the pretilt angle on one substrate side is different from that on the other substrate side, reference orientation directions different from each other by 180° are formed. Another reference orientation direction which is perpendicular to these reference orientation directions is formed by combining the substrates in such a manner that the pretilt angle on one substrate side is equal to that on the other substrate side. As a result, two or three reference orientation directions can be formed in one and the same liquid crystal cell, and the viewing characteristics in two or three viewing directions are mixed and made uniform. Between adjacent liquid crystal layer regions having reference orientation directions different from each other by 180°, a liquid crystal layer region in which the pretilt angle on one substrate side is equal to that on the other substrate side is formed. The liquid crystal layer region having equal pretilt angles on both sides has a smaller area than the adjacent liquid crystal layer regions. As the result of the construction, there occurs no discontinuity in liquid crystal at the boundary between different aligning characteristics, so that a disclination line is not generated.

In the LCD of the invention, the boundary between different aligning conditions on one substrate is disposed so as to divide one aligning condition on the other substrate. Thus, it is unnecessary to form a black matrix at the boundary in view of the misalignment.

The LCD according to the invention which is produced as the result of the above-described aligning regulations can provide an image with high contrast and high quality. According to the invention, the viewing angle dependency of the LCD can be eliminated, and disadvantageous phenomena such as the phenomenon in which one aligning condition is absorbed by another aligning condition as time elapses can be suppressed. In addition, a disclination line can be prevented from being generated at the boundary between liquid crystal layer regions having different reference orientation directions. Moreover, when a light blocking film is formed, it is possible to prevent light (if any) from being leaked from a disclination line. Therefore, according to the invention, a reliable LCD with improved display quality can be provided.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display apparatus comprising:

a first substrate and a second substrate disposed to face each other;

a liquid crystal layer sandwiched between the first substrate and the second substrate; and a first alignment film formed between formed between the liquid crystal layer and the first substrate and a second alignment film formed between the liquid crystal layer and the second substrate;

wherein the liquid crystal layer includes a plurality of liquid crystal layer regions having aligning conditions which are different from each other, optical transmittance of the plurality of liquid crystal layer regions being variable to conduct display, the plurality of liquid crystal layer regions including a first liquid crystal layer region and a second liquid crystal layer region, wherein an orientation direction in a substrate plane of liquid crystal molecules in the vicinity of the center of the first liquid crystal layer region is different from an orientation direction in the substrate plane of liquid crystal molecules in the vicinity of the center of the second liquid crystal layer region, substantially by 90°, and wherein a pretilt angle of the first alignment film is different from a pretilt angle of the second alignment film in the first liquid crystal layer region, and a pretilt angle of the first alignment film is substantially the same as a pretilt angle of the second alignment film in the second liquid crystal layer region.

2. A liquid crystal display apparatus according to claim 1, wherein liquid crystal molecules in the second liquid crystal layer region are twisted in a direction opposite to a direction in which liquid crystal molecules in the first liquid crystal layer region are twisted.

3. A liquid crystal display apparatus according to claim 1, wherein a surface condition of the first alignment film is different from a surface condition of the second alignment film in the first liquid crystal layer region, and a surface condition of the first alignment film is substantially the same as a surface condition of the second alignment film in the second liquid crystal layer region.

4. A liquid crystal display apparatus according to claim 1, wherein a surface condition of the first alignment film in the first liquid crystal layer region is substantially equal to a surface condition of the first alignment film in the second liquid crystal layer region, and a surface condition of the second alignment film in the first liquid crystal layer region is different from a surface condition of the second alignment film in the second liquid crystal layer region.

5. A liquid crystal display apparatus according to claim 4, wherein a pretilt angle of the first alignment film has an intermediate value between a pretilt angle of the second alignment film in the first liquid crystal layer region and a pretilt angle of the second alignment film in the second liquid crystal layer region.

6. A liquid crystal display apparatus according to claim 1, wherein the plurality of liquid crystal layer regions further includes a third liquid crystal layer region, and an orientation direction in the substrate plane of liquid crystal molecules in the vicinity of the center of the third liquid crystal layer region is different from the orientation direction in the first liquid crystal layer region by 180°, and different from the orientation direction in the second liquid crystal layer region by 90°.

7. A liquid crystal display apparatus according to claim 6, wherein a pretilt angle of the first alignment film and a pretilt angle of the second alignment film in the third liquid crystal layer region are smaller than 20°, and a difference between the pretilt angles of the first and the second alignment films in the third liquid crystal layer region is 1.5° or more.

8. A liquid crystal display apparatus according to claim 7, wherein the pretilt angle of the first alignment film is larger than the pretilt angle of the second alignment film in the first liquid crystal layer region, and the pretilt angle of the first alignment film is smaller than the pretilt angle of the second alignment film in the third liquid crystal layer region.

9. A liquid crystal display apparatus according to claim 7, wherein the pretilt angle of the first alignment film is smaller than the pretilt angle of the second alignment film in the first liquid crystal layer region, and the pretilt angle of the first alignment film is larger than the pretilt angle of the second alignment film in the third liquid crystal layer region.

10. A liquid crystal display apparatus according to claim 6, wherein the second liquid crystal layer region is formed between the first liquid crystal layer region and the third liquid crystal layer region.

11. A liquid crystal display apparatus according to claim 10, wherein the first, the second, and the third liquid crystal layer regions have substantially equal areas.

12. A liquid crystal display apparatus according to claim 10, wherein an area of the second liquid crystal layer region is smaller than an area of each of the first and the third liquid crystal layer regions.

13. A liquid crystal display apparatus according to claim 6, wherein the first alignment film has equal surface conditions in all of the first, the second, and the third liquid crystal layer regions, and wherein the second alignment film has different surface conditions among the first, the second, and the third liquid crystal layer regions.

14. A liquid crystal display apparatus according to claim 6, wherein a surface condition of the first alignment film in the second liquid crystal layer region is substantially equal to a surface condition of the first alignment film in the first liquid crystal layer region, and a surface condition of the second alignment film in the second liquid crystal layer region is substantially equal to a surface condition of the second alignment film in the third liquid crystal layer region.

15. A liquid crystal display apparatus according to claim 14, wherein pretilt angles of the second alignment film in the first, the second, and the third liquid crystal layer regions are different from each other.

16. A liquid crystal display apparatus according to claim 1, wherein each of the plurality of liquid crystal layer regions corresponds to one pixel region.

17. A liquid crystal display apparatus according to claim 16, further comprising a light blocking film located on the boundary between the plurality of liquid crystal layer regions.

18. A liquid crystal display apparatus according to claim 17, wherein a nonlinear element is formed in the pixel region, and the light blocking film is formed of an opaque material which constitutes the nonlinear element.

19. A liquid crystal display apparatus according to claim 1, wherein the plurality of liquid crystal layer regions are formed in one pixel region.

20. A liquid crystal display apparatus according to claim 19, wherein a nonlinear element is formed in the pixel region, and the nonlinear element is positioned as far as possible from the boundary between the plurality of liquid crystal layer regions.

21. A liquid crystal display apparatus according to claim 19, wherein an orientation direction in the substrate plane of liquid crystal molecules which are in contact with one of the first alignment film and the second alignment film is substantially parallel to a boundary between the plurality of liquid crystal layer regions.

22. A liquid crystal display apparatus according to claim 1, wherein each of the plurality of liquid crystal layer regions are continuously formed over a plurality of pixel regions.

23. A liquid crystal display apparatus according to claim 22, wherein an orientation direction in the substrate plane of liquid crystal molecules which are in contact with one of the first alignment film and the second alignment film is substantially parallel to a boundary between the plurality of liquid crystal layer regions.

24. A liquid crystal display apparatus according to claim 22, wherein a nonlinear element is formed in the pixel region, and the nonlinear element is positioned as far as possible from the boundary between the plurality of liquid crystal layer regions.

25. A liquid crystal display apparatus according to claim 1, wherein the pretilt angle of the first alignment film and the pretilt angle of the second alignment film in the first liquid crystal layer region are smaller than 20°, and a difference between the pretilt angles of the first and second alignment films in the first liquid crystal layer region is 1.5° or more.

26. A method for producing a liquid crystal display apparatus comprising a first substrate and a second substrate disposed to face each other and liquid crystal sandwiched between the first substrate and the second substrate, the method comprising:

a step of forming a first alignment film on the first substrate, and forming a second alignment film on the second substrate;

a surface treatment step of forming a plurality of portions having surface conditions which are different from each other, on at least one of the first alignment film and the second alignment film; and an assembly step of attaching the first substrate to the second substrate, and injecting the liquid crystal between a first substrate and the second substrate, so as to form a plurality of liquid crystal layer regions having different orientation directions in a substrate plane of liquid crystal molecules in the vicinity of the center of the liquid crystal along a thickness direction of the liquid crystal between the first and the second substrates, the plurality of liquid crystal layer regions having variable optical transmittance to conduct display, wherein the plurality of liquid crystal layer regions includes a first liquid crystal layer region and a second liquid crystal layer region; an orientation direction in the substrate plane of liquid crystal molecules in the vicinity of the center of the first liquid crystal layer region is different from an orientation direction in the substrate plane of liquid crystal molecules in the vicinity of a center of the second liquid crystal layer region substantially by 90°; and a pretilt angle of the first alignment film is different from a pretilt angle of the second alignment film in the first liquid crystal layer region, and a pretilt angle of the first alignment film is substantially the same as a pretilt angle of the second alignment film in the second liquid crystal layer region.

27. A method for producing a liquid crystal display apparatus according to claim 26, wherein the plurality of liquid crystal layer regions further includes a third liquid crystal layer region, and an orientation direction in the substrate plane of liquid crystal molecules in the vicinity of the center of the third liquid crystal layer region is different from the orientation direction in the first liquid crystal layer region substantially by 180°, and different from the orientation direction in the second liquid crystal layer region substantially by 90°.

28. A method for producing a liquid crystal display apparatus according to claim 27, wherein the first alignment film includes a first and a second portions having different pretilt angles, and the second alignment film includes a third and a fourth portions having different pretilt angles, and wherein the method further includes a step of positioning the first and the second substrates so that the second portion of the first alignment film is divided by a boundary between the third and the fourth portions of the second alignment film.

29. A method for producing a liquid crystal display apparatus according to claim 26, wherein the surface treatment step includes a step of forming a plurality of portions having different pretilt angles by partially changing the surface condition of at least one of the first and the second alignment films.

30. A method for producing a liquid crystal display apparatus according to claim 29, wherein the step of forming the plurality of portions having different pretilt angles includes a step of bringing the at least one of the first and the second alignment films into contact with one of an acid solution, an alkaline solution, and solutions containing these as main components.

31. A method for producing a liquid crystal display apparatus according to claim 29, wherein the step of forming the plurality of portions having different pretilt angles includes a step of irradiating the at least one of the first and the second alignment films with a plasma of a gas selected from a group consisting of $O_2$, Ar, and Kr.

32. A method for producing a liquid crystal display apparatus according to claim 29, further comprising a step of forming an underlying film on each of the first and the second substrates, prior to the step of forming the first and the second alignment films, wherein the surface treatment step includes a step of making a part of at least one of the underlying films having different degrees of roughness, and a step of forming the first and the second alignment films on the underlying films, thereby changing a surface condition of at least one of the first and the second alignment films.

33. A method for producing a liquid crystal display apparatus according to claim 32, wherein the step of making different degrees of roughness includes a step of selectively irradiating the underlying film with ultraviolet rays.

34. A method for producing a liquid crystal display apparatus according to claim 32, wherein the step of making different degrees of roughness includes a step of bringing the underlying film into contact with one of an acid solution, an alkaline solution, and solutions containing these as main components.

35. A method for producing a liquid crystal display apparatus according to claim 32, wherein the step of making different degrees or roughness includes a step of irradiating the underlying film with a plasma of a gas selected from a group consisting of $O_2$, Ar, and Kr.

36. A method for producing a liquid crystal display apparatus according to claim 32, wherein the step of making different degrees of roughness includes a step of forming an insulating film on a predetermined area of a surface of the underlying film.

37. A method for producing a liquid crystal display apparatus according to claim 32, wherein the step of making different degrees of roughness includes a step of forming the different degrees of roughness in at least one of the underlying films by photolithography.

38. A method for producing a liquid crystal display apparatus according to claim 32, wherein, in the step of forming the first and the second alignment films on the underlying films, a surface condition of at least one of the first and the second alignment films is controlled by changing a thickness of the at least one of the first and the second alignment films.

39. A method for producing a liquid crystal display apparatus according to claim 29, wherein the step of forming the plurality of portions having different pretilt angles includes a step of selectively irradiating the at least one of the first and the second alignment films with ultraviolet rays.

40. A method for producing a liquid crystal display apparatus according to claim 26, wherein in the assembly step, the first and the second substrates are assembled so as to adapt to liquid crystal having a twisted property in a direction opposite to a direction in which the injected liquid crystal is twisted, whereby the twisted directions in the plurality of liquid crystal layer regions are different from each other.

* * * * *